United States Patent [19]
Collings

[11] Patent Number: 5,828,402
[45] Date of Patent: Oct. 27, 1998

[54] METHOD AND APPARATUS FOR SELECTIVELY BLOCKING AUDIO AND VIDEO SIGNALS

[75] Inventor: Timothy David Collings, White Rock, Canada

[73] Assignee: Canadian V-Chip Design Inc., Burnaby

[21] Appl. No.: 761,091

[22] Filed: Dec. 5, 1996

Related U.S. Application Data

[63] Continuation-in-part of Ser. No. 667,030, Jun. 20, 1996.

[30] Foreign Application Priority Data

Jun. 19, 1996 [CA] Canada .................................. 2179474

[51] Int. Cl.$^6$ ................. H04N 7/16; H04N 7/00
[52] U.S. Cl. .................. 348/5.5; 380/20; 348/460; 348/906
[58] Field of Search .............. 380/20; 348/5.5, 348/460, 906

[56] References Cited

U.S. PATENT DOCUMENTS

| | | |
|---|---|---|
| 4,163,254 | 7/1979 | Block et al. . |
| 4,225,884 | 9/1980 | Block et al. . |
| 4,484,217 | 11/1984 | Block et al. . |
| 4,520,404 | 5/1985 | Von Kohorn . |
| 4,528,589 | 7/1985 | Block et al. . |
| 4,554,584 | 5/1985 | Elam et al. . |
| 4,605,964 | 8/1986 | Chard . |
| 4,888,796 | 12/1989 | Olivo, Jr. . |
| 4,930,158 | 5/1990 | Vogel . |
| 4,930,160 | 5/1990 | Vogel . |
| 5,053,884 | 10/1991 | Kamijyo . |
| 5,172,111 | 12/1992 | Olivo, Jr. . |
| 5,195,135 | 5/1993 | Palmer . |
| 5,253,066 | 10/1993 | Vogel . |
| 5,270,822 | 12/1993 | Choi . |
| 5,301,233 | 4/1994 | Coutrot et al. . |
| 5,307,165 | 4/1994 | Kawashima et al. . |
| 5,319,453 | 6/1994 | Copriviza et al. . |
| 5,321,750 | 6/1994 | Nadan . |
| 5,333,091 | 7/1994 | Iggulden et al. . |
| 5,341,216 | 8/1994 | Hoffart . |
| 5,343,251 | 8/1994 | Nafeh . |
| 5,361,301 | 11/1994 | Robertson et al. . |
| 5,369,440 | 11/1994 | Sussman . |
| 5,371,795 | 12/1994 | Vogel . |
| 5,373,557 | 12/1994 | Diehl et al. . |
| 5,382,983 | 1/1995 | Kwoh et al. . |
| 5,386,240 | 1/1995 | Hori . |
| 5,387,942 | 2/1995 | Lemelson . |

(List continued on next page.)

FOREIGN PATENT DOCUMENTS

| | | |
|---|---|---|
| 2678091 | 6/1991 | France . |
| 0413225 A2 | 8/1990 | Germany . |
| 0413225 A3 | 8/1990 | Germany . |
| 59-210782 | 11/1984 | Japan . |
| 2209417 | 5/1989 | United Kingdom . |
| WO 96/27840 | 9/1996 | WIPO . |
| WO 96/27983 | 9/1996 | WIPO . |

*Primary Examiner*—Stephen C. Buczinski
*Attorney, Agent, or Firm*—Oyen Wiggs Green & Mutala

[57] ABSTRACT

A method and apparatus block the reception of television programming which meets specified criteria. Data packets describing television programming are broadcast with the television signal. The data packets include at least packets which contain category information specifying a level in one or more multi-level categories and/or label information specifying labels applied to the program content of the signal. Data packets in an incoming video signal are detected by a blocking apparatus and compared to preferences stored in non-volatile memory in the blocking apparatus. If the contents of the data packets match or exceed the stored preferences then the video signal is blocked. The apparatus is field configurable. Configuration information specifying the rating scheme is transmitted to the apparatus. The methods of the invention are extremely flexible and allow several different rating systems to be used simultaneously.

15 Claims, 15 Drawing Sheets

U.S. PATENT DOCUMENTS

| | | |
|---|---|---|
| 5,410,344 | 4/1995 | Graves et al. . |
| 5,425,100 | 6/1995 | Thomas et al. . |
| 5,440,632 | 8/1995 | Bacon et al. ............................... 380/20 |
| 5,446,488 | 8/1995 | Vogel . |
| 5,450,122 | 9/1995 | Keene . |
| 5,455,892 | 10/1995 | Minot et al. . |
| 5,477,262 | 12/1995 | Banker et al. . |
| 5,485,518 | 1/1996 | Hunter et al. . |
| 5,548,345 | 8/1996 | Brian et al. . |
| 5,550,575 | 8/1996 | West et al. ............................... 348/5.5 |
| 5,552,837 | 9/1996 | Mankovitz . |
| 5,583,576 | 12/1996 | Perlman et al. . |

The Simpsons     WUTV
Length:   30 min     Time In:   13 min

Type:           Animated  Comedy
Rating:    PG
Violence:  Comedic
Language:  Suggestive
Sexuality: None
Labels:    Mature Content Press [1] to view program

FIGURE 3

Restricted Labels

[1] ALLOW:     Mild Action
[2] BLOCK:     Action
[3] BLOCK:     Sexuality
[4] ALLOW:     Language
[5] BLOCK:     Mature Content
[6] ALLOW:     Family
[7] BLOCK:     Graphic Violence
[8] BLOCK:     Nudity Press [1] to [8] on Remote
   Press [M] to Exit

FIGURE 5E

Restricted Types

[1] ALLOW:     Animated
[2] BLOCK:     Crime
[3] BLOCK:     Fantasy
[4] ALLOW:     Football
[5] BLOCK:     Horror
[6] ALLOW:     Movie
[7] BLOCK:     News
[8] <more>

Press [1] to [8] on Remote
   Press [M] to Exit

FIGURE 5F

Blocked Stations

[1] WUTV
[2] TSN
[3] HBO
[4] FOX
[5] SC
[6] WDET
[7] WFLA
[8] <more>

Press [1] to [8] on Remote
   Press [M] to Exit

FIGURE 5G

Blocked Titles

[1] The Simpsons
[2] Married With Children
[3] The X Files
[4] Power Rangers
[5] Melrose Place
[6] X Men
[7] Ricky Lake
[8] <more>

Press [1] to [8] on Remote
   Press [M] to Exit

FIGURE 5H

```
         Viewing Times

[1] Morning Start          03:00 am
[2] Morning Duration       9.0 hours
[3] Afternoon Start        12:00 pm
[4] Afternoon Duration     6.0 hours
[5] Evening Start          6:00 pm
[6] Evening Duration       9.0 hours
[7] Set Time Zone          EST Press [1] to [7] on Remote
    Press [M] to Exit
```

FIGURE 5I

The Simpsons          WUTV
Length:    30 min     Time In:    13 min

Type:              Animated   Comedy
Rating:    PG
Violence:  Comedic
Language:  Suggestive
Sexuality: None
Labels:    Mature Content Press [1] to block Title
Press [2] to block Station

FIGURE 6

METHOD AND APPARATUS FOR SELECTIVELY BLOCKING AUDIO AND VIDEO SIGNALS

CROSS REFERENCE TO RELATED APPLICATION

This application is a continuation-in-part of co-pending application Ser. No. 08/667,030, file Jun. 20, 1996, entitled METHOD AND APPARATUS FOR SELECTIVELY BLOCKING AUDIO AND VIDEO SIGNALS.

FIELD OF THE INVENTION

This invention relates to apparatus and methods for selectively blocking the reception of video signals in response to information which is encoded in the signals. The method and apparatus of the invention have particular application in controlling the content of television programming that can be displayed on a television.

BACKGROUND OF THE INVENTION

Television viewers are faced with an increasingly diverse selection of programs to choose from. At the same time, our society is becoming more diverse. Some programs contain content which some viewers may consider to be offensive or inappropriate for viewing by their children. There is a need for an effective way to block offensive or inappropriate material from being viewed.

As the number of available television channels increases it is becoming increasingly difficult for television viewers to locate and select programming that interests them from the many programs that may be completely uninteresting. There is a need for a system which would allow a television viewer to limit the selection of programs available for viewing to those programs which match the viewer's preferences.

Vogel, U.S. Pat. No. 4,930,160 discloses methods and apparatus for automatically censoring video programs. If a classification code encoded in the video or audio portion of a video signal matches a stored classification code then an alternative video signal is displayed.

Elam, U.S. Pat. No. 4,554,584 discloses a circuit for blanking the audio and video portions of a video signal in response to digital code words transmitted in the video signal. The code words are transmitted as ASCII codes in line 21 of the video signal. The picture and sound are blanked whenever the received ASCII code matches or exceeds a value selected by the user.

Lemelson, U.S. Pat. No. 5,387,942 discloses a system which would allow parents to block the reception of television programming which they consider to be inappropriate for their children. Lemelson discloses a video reception control unit. The control unit responds to 3-digit binary codes embedded in a received video signal. The codes indicate respectively whether or not the program content of the received video signals includes violence, coarse language and nudity. A viewer can set the control unit to block transmission of the received video signal to a television whenever all, or selected ones, of the codes indicate the presence of adult subject matter. The control unit is lockable to prevent determined children from tampering with its settings.

Other prior art video blocking systems and related systems and methods are disclosed in the following U.S. Pat. Nos.: Chard 4,605,964; Olvio Jr., 4,888,796; Olvio Jr. 5,172,111; Kwoh et al. 5,382,983; Hunter Et al., 5,485,418; Banker et al. 5,477,262; Vogel et al., 4,930,158; Nafeh 5,343,251; Choi, 5,270,822; Keene 5,450,122; Vogel, 5,253,066; Vogel 5,371,795; Copriviza et al. 5,319,453; Graves et al. 5,410,344; Palmer. 5,195,135; Kamijyo, 5,053,884; Von Kohorn, 4,520,404; Hoffart, 5,341,216; Thomas et al. 5,425,100; Nadan 5,321,750; Hori, 5,386,240; Vogel, 5,446,488; Iggulden et al. 5,333,091; Robertson et al. 5,361,301; Kawashima et al., 5,307,165; Diehl et al., 5,373,557; Coutrot et al, 5,301,233; Sussman 5,369,440; and Minot et al. 5,455,892.

SUMMARY OF THE INVENTION

As noted above, the prior art includes various devices which block reception of an incoming video signal when a code encoded in the signal matches a code stored in the device. The inventor has recognized that the previous video blocking systems known to the inventor share the disadvantage that they assume that a single consistent coding scheme will be used for all video programs. The prior art blocking systems include devices which must be constructed or initially programmed with advance knowledge of the coding scheme to be used. The advance knowledge must include what codes are used in the coding scheme and embedded in the incoming video signal and should also include the meanings of those codes. Further, such systems cannot readily provide selective blocking where different coding schemes are used on different programs or in different channels that may be received in one location.

A further disadvantage of prior art video blocking systems is that, where different coding schemes are used in, for example, different geographical regions and a blocking device is moved from one region to another or where new coding schemes are introduced to replace or supplement existing coding schemes, then the prior art units must be rewired or reprogrammed. This is extremely expensive because very many blocking devices will be affected.

This invention provides a video blocking system capable of dealing with programs which may be coded according to two or more distinct coding schemes. Accordingly, the invention provides:

BRIEF DESCRIPTION OF THE DRAWINGS

In drawings which illustrate non-limiting preferred embodiments of the invention.

FIG. 3 is a drawing of an on screen display produced when a video signal is being blocked;

FIGS. 5A, 5B, 5C, 5D, 5E, 5F, 5G, 5H, and 5I are examples of on screen menu displays that could be produced by currently preferred embodiments of the apparatus of FIG. 2;

FIG. 6 is an example of an informational screen display that may be produced by the apparatus of FIG. 2; and, FIG. 7 is a schematic diagram of a data structure for storing configuration information according to a preferred embodiment of the invention.

DETAILED DESCRIPTION OF PREFERRED EMBODIMENTS OF THE INVENTION

Figure 1:
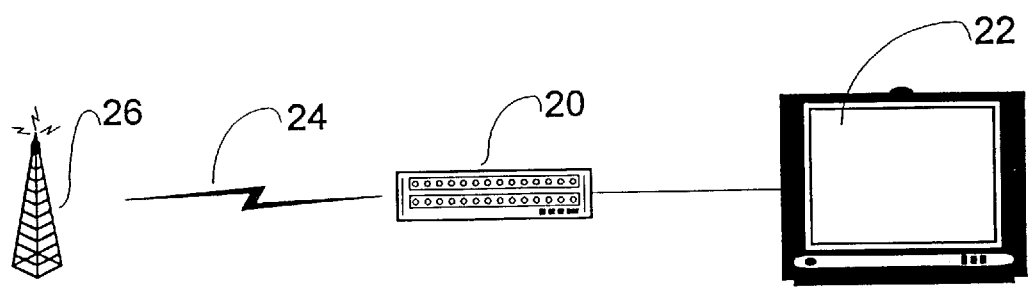
FIG. 1 is a block diagram showing video blocking apparatus of the invention connected between an incoming video signal and a television.

In the invention, as shown in FIG. 1, information about video programming being carried in a video signal 24 is encoded and the encoded information is embedded in video signal 24 by a broadcaster 26. An apparatus 20 retrieves and decodes the embedded information. Apparatus 20 is in the signal path between the broadcaster 26 and a viewer's television screen. If the decoded information matches stored user preferences stored in a memory in, or otherwise accessible to, apparatus 20 then apparatus 20 blocks the video component of video signal 24 from being displayed on a video display, such as the viewer's television monitor 22, and also preferably blocks any audio component of video signal 24 from being played. This provides the viewer, or the viewer's parent or guardian, with some control over the television programming that the viewer can be exposed to. In the alternative, apparatus 20 may permit viewing of video signal 24 only if the decoded information matches certain stored user preferences.

Incoming video signal 24 may be delivered to apparatus 20 by satellite, by cable, by VHF or UHF broadcast or in any other suitable way. Incoming video signal 24 may also be the output from a video playback device, for example, a video cassette recorder ("VCR") or a laser disk player. In the latter case, the "broadcaster" 26 is the party who provided the recorded signal which is played back to create incoming video signal 24.

Apparatus 20 is preferably built into a television set 22 but may also be provided as a stand-alone unit. Where apparatus 20 is provided as a stand-alone unit suitable locking means are provided to prevent the operation of apparatus 20 from being frustrated by routing incoming video signal 24 so that it bypasses apparatus 20.

Figure 2:
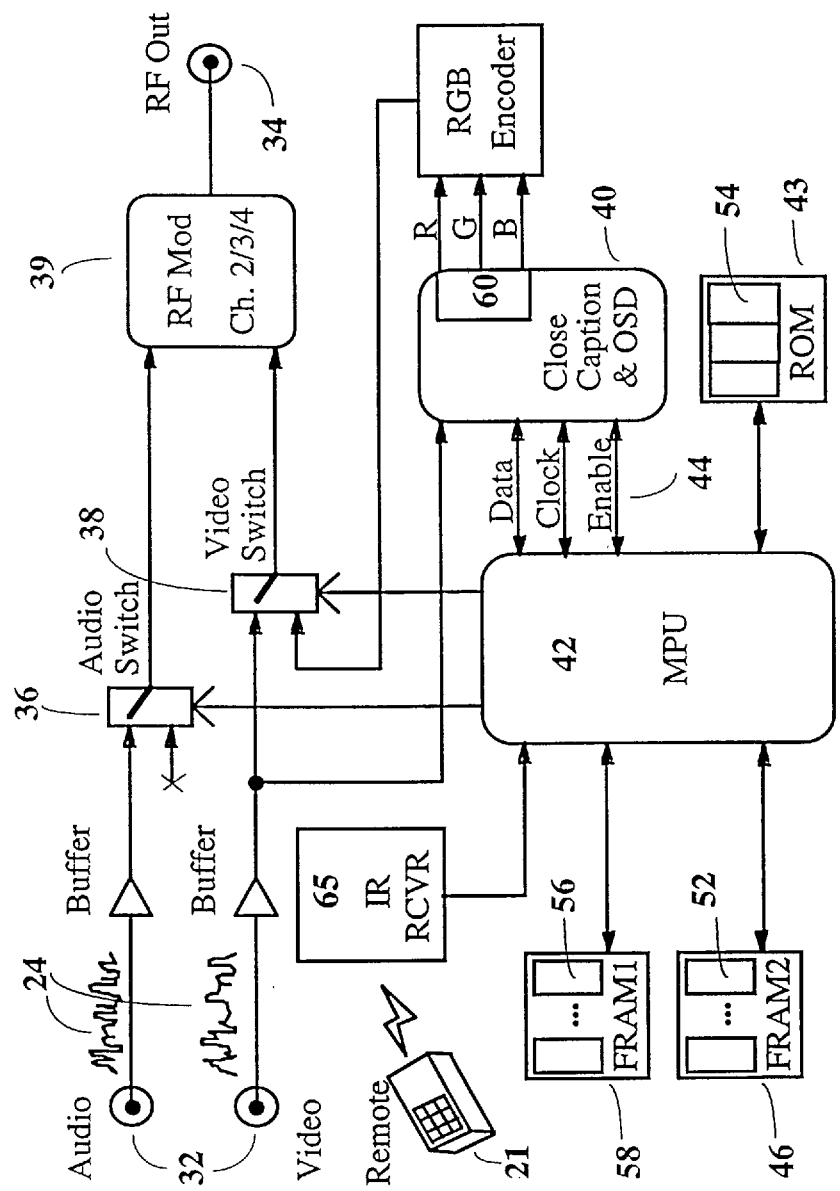
FIG. 2 is a block diagram of video signal blocking apparatus according to the invention.

As shown in FIG. 2, apparatus 20 has inputs 32 for one or more signals, such as composite audio and video signals, which comprise incoming video signal 24. Inputs 32 may be connected, for example, to the audio and video outputs from a VCR, a television tuner, or a cable converter. Inputs 32 are preferably buffered to prevent unnecessary loading of the source of video signal 24. Apparatus 20 also has an output 34 which may be connected to the video input of a television set. Switching means 36 and 38 are connected between inputs 32 and output 34. Separate outputs (not shown) for composite video and composite audio and/or other signal format(s) may also be provided in addition to or instead of a single output 34.

When apparatus 20 is not blocking a signal then switching means 36 and 38 are in a non-blocking or "ON" state so that video from inputs 32 passes through switching means 36 and 38, through rf modulator 39 and out of output 34. RF modulator 39 combines the audio and video signals from inputs 32 into a rf signal which can be received by a standard television set. Switching means 36 and 38 are preferably electromechanical relays or electronic switches but may be any other switching means capable of preventing incoming video signal 24 at inputs 32 from being passed to output 34 in a form capable of being viewed on the screen of television 22. Switching means 36 and 38 may even be switchable filters or other apparatus which can selectively degrade signal 24, or add noise to signal 24, to the point that signal 24, is no longer capable of being viewed on the screen of television 22 when it exits apparatus 20 if switching means 36 and 38 is in a blocking or "OFF" state.

When apparatus 20 detects one or more embedded codes in video signal 24 that represent information which indicates that video signal 24 should be blocked then apparatus 20 turns switching means 36 and 38 OFF, as described below, thereby preventing video signal 24 from reaching output 34. When video signal 24 is being blocked, video switching means 38 may connect to an alternative video signal, for example a signal containing a graphic which indicates that video signal 24 is being blocked. The graphic may optionally provide details about the program being blocked, such as its title etc. Preferably switching means 36 and 38 are OFF when apparatus 20 is not powered so that the operation of apparatus 20 cannot be defeated by disconnecting apparatus 20 from its power source.

Information about the program content of a received video signal is preferably encoded and encoded as digital data packets which are transmitted with the video signal. The data packets are inserted by broadcaster 26 or by a cable company who retransmits video signal 24.

In the preferred embodiment of the invention, the data packets are embedded in video signal 24 by transmitting them during the video blanking interval of video signal 24. In North America, the video blanking interval comprises lines 10 through 21 of a video signal. Most preferably, the data packets each comprise data bytes transmitted in the Extended Data Services ("XDS") portion of a video signal. XDS data is transmitted in line 21 of the video signal as defined by Electronic Industries Association specification No. EIA-608, which is incorporated herein by reference. It is desirable to use line 21 because almost all new television sets sold in the North America are required to have a built-in decoder for XDS data transmitted on line 21.

Specification No. EIA-608 specifies protocols for embedding digitally encoded information packets containing information about a television program which is being currently broadcast. Each XDS data packet begins with a "start" character which also indicates the "class" of the information (i.e. generally what the information in the packet relates to). For example: the start character for data about a current program (the "Current" class) is 01h; the start character for data about the current channel (the "Channel Information" class) is 05h; and, the start character for "undefined" data (the "Undefined" class) is 0Dh. A data type character which indicates the specific nature of the information being transmitted follows the start character. Each information packet ends with an "end" character, which is defined in EIA-608 to be 0Fh, and a checksum character.

EIA-608 defines codes for transmitting some information that is useful for practicing the invention. Other information for practising the invention can be conveniently transmitted as XDS data using the undefined data type provided by EIA-608, as discussed below. Of course, this or similar information could also be encoded and transmitted in ways which do not conform with the EIA-608 specification. It will be readily apparent to those skilled in the art that the invention could be practiced with other protocols and/or by encoding and embedding any necessary data in video signal 24 using other encoding and/or embedding techniques. What is important is that the incoming video signal 24 have somehow embedded in it codes which convey at least some of the information described below.

Table I lists some types of XDS data which are defined by EIA-608 and are useful in the invention.

TABLE I

XDS Data Types

| Start Char. | Data Type Char. | Size of Data (Bytes) | Meaning |
|---|---|---|---|
| 01h | 02h | 2 | Duration: Length of show (hours and minutes) |
| 01h | 02h | 2 | Time-in Show: Elapsed time in program (hours and minutes) |
| 01h | 03h | 2–32 | Title: Title of program (up to 32 standard ASCII characters) |
| 01h | 04h | 2–4 | Type: A keyword describing the type of program e.g. "horror", "comedy", "talk show", "news" etc. |
| 01h | 05h | 2 | Rating: Motion Pictures Association of America ("MPAA") or Canadian Motion Picture Distributors Association ("CMPDA") (or equivalent) rating |
| 01h | 10h to 17h | | Advisory: Consists of key words or short key phrases that describe the subject matter and content of a television program. |
| 05h | 02h | 4 | Call Letters: Call letters of local broadcaster |
| 07h | 01h and 04h | 4–6 | Time: Time of day |

Information about a program may include category information, which identifies a level assigned to the program in each of one or more categories. An example of a category is the "Rating" information described in Table I. Each program may be assigned a rating which ranges from, for example, "Exempt" to "X-Rated" through a series of intermediate levels. Information about a program may also be provided in the form of labels which may be used to indicate whether certain subject matter is present in the program. For example, labels may include things such as "Action", "Drug-use", "Adult", "Talk-show" etc.

In this application, the term "informational scheme" means a set of kinds of information that may be transmitted about a program, a set of values that may be transmitted for the different kinds of information and the meanings of those values. An informational scheme may include several groups of labels. Different groups of labels may describe different aspects of a program or may contain labels assigned by different rating organizations. The data types "Type" and "Advisory" which are specified by EIA-608 are examples of groups of labels that may be assigned to video programs. An informational scheme may provide one or more groups of labels not specified by EIA-608 in addition to or instead of the labels specified by EIA-608.

In addition to some or all of the predefined data types described above, the preferred embodiment of the invention provides embedded codes containing category information. Category information is information which describes a level assigned to the currently broadcast program according to at least one additional category. For example, in a preferred embodiment of the invention, the current program is rated in each of three categories. The categories respectively assign levels to the program in respect of its degrees of violence, sexuality and coarse language. Category information in respect of these three scales can conveniently be transmitted as XDS data in unused parts of the "Rating" data packet (start character 05h) of the Current class. In the alternative, this additional category information could be transmitted as data in the XDS "Undefined" class, or may be otherwise transmitted.

The inventor has found that it is generally desirable to provide category information on a graduated scale in which the lowest level of the scale describes unoffensive program content and the highest level of the scale indicates program content that many viewers could find highly offensive. Between the highest and lowest levels on the scale are intermediate levels. Most preferably each scale contains between 3 and 7 levels. This provides sufficient flexibility and yet minimizes the amount of effort required for broadcaster 26, or a rating organization, to assign a level or levels to the program in each category. A scale containing 3 to 7 levels is not overly complicated for a viewer to understand and set up. Preferably, apparatus for use in the invention should be capable of accommodating informational schemes which include as many as 16 categories, each category having as many as 16 levels.

As a 3-bit binary number can have 8 possible values, a data packet containing two 7-bit characters can store category information for a program in 4 independent categories each having up to 8 levels. For example, Table II illustrates a combination of four categories that could make up an informational scheme to be applied to television programs broadcast by a broadcaster. The meanings attributed to the levels in each category are defined by the persons or body that sets standards for the category in question. For example, Table III explains possible meanings of the levels in the "Rating" category of Table II.

TABLE II

EXAMPLE CATEGORIES

| DATA | RATING (c) | VIOLENCE (v) | LANGUAGE (l) | SEXUALITY (s) |
|---|---|---|---|---|
| 0 | Exempt | none | none | none |
| 1 | General | comedic | suggestive | mature themes |
| 2 | PG | mild | mild | brief nudity |
| 3 | Adult | brief | coarse | mild sexuality |
| 4 | Restricted | strong | strong | full nudity |
| 5 | X-Rated | graphic | explicit | sexual activity |

The category information of Table II may be encoded in two 7-bit characters, char1 and char2. For example, this may be done as follows:

| | bit6 | bit5 | bit4 | bit3 | bit2 | bit1 | bit0 |
|---|---|---|---|---|---|---|---|
| char1 | 1 | v2 | v1 | v0 | c2 | c1 | c0 |
| char2 | 1 | s2 | s1 | s0 | l2 | l1 | l0 | v2, v1 and v0 are the values of the three bits which indicate the level in the violence category of violence in the program; s2, s1 and s0 are the values of the three bits which indicate the level in the sexuality category of sexuality in the program; l2, l1 and l0 are the values of the three bits which indicate the level in the language category of coarse language in the program; and c2, c1 and c0 are the values of the three bits which indicate the level in the rating category of the rating for the program. Each of char1 and char2 has a value between 40h and 7Fh. For example, a "PG" program (c=2) with comedic violence (v=1) suggestive language (l=1) and brief nudity (s=2) would have bits allocated to char1 and char2 as follows:

|       | bit6 | bit5 | bit4 | bit3 | bit2 | bit1 | bit0 |
|-------|------|------|------|------|------|------|------|
| char1 | 1    | 0    | 0    | 1    | 0    | 1    | 0    |
| char2 | 1    | 0    | 1    | 0    | 0    | 0    | 1    |

TABLE III

CLASS RATING (c)

| LEVEL | RATING (C) | DESCRIPTION |
|-------|------------|-------------|
| 0 | E | Exempt - news , sports , documentaries etc. |
| 1 | G | General Audience - suitable for viewing by all ages |
| 2 | PG | Parental Guidance advised below 13 years of age - Themes may not be suitable for children. May contain brief violence, coarse language and/or mature themes |
| 3 | A | Adult - suitable for persons 16 years of age and older. Those under 16 should view with an adult. will likely contain violence, strong language and/or nudity. |
| 4 | R | Restricted to 18 years of age and older- content not suitable for those under the age of 18. contains graphic violence, explicit language and/or sexual activity. |

Information about the content of video signal 24 could also be encoded and embedded in video signal 24 as ASCII strings and transmitted in over one of the text channels (T1 or T2) which are also defined in EIA-608. If embedded codes are to be transmitted on a text channel then, preferably, each embedded code consists of a pair of delimiter characters, which respectively identify the start and end of an embedded code, a data identifier, which identifies the meaning of data in the embedded code and some data. The characters in the embedded code are preferably selected from the ASCII symbols.

For example, an embedded code could contain the 4 ASCII characters "<V4>". The delimiter characters "<" and ">" indicate the start and end of the embedded code respectively. The data identifier "V" could indicate that the accompanying data indicates the level in the violence category of violence in the program content of the received video signal 24. The numeral "4" indicates that the violence level is 4 on a scale of, for example, 0 to 5. Where embedded codes are transmitted in a text channel then, for example, a film rated "Adult" with an advisory for brief violence, mild language and brief nudity could have embedded in it, among others, the codes <C3><V3><L2><S2>.

If embedded codes are transmitted on a text channel in which other textual information is also being transmitted then each embedded code should consist of a sequence of characters that is very unlikely to occur in any other data in the channel being used to transmit the embedded codes.

Each different type of embedded code can be transmitted by broadcaster 26 at a different rate. XDS data transmitted according to EIA-608 has a maximum throughput of about 60 characters per second. Consequently, where data packets are transmitted as XDS data on line 21 of video signal 24 the relevant program information should occupy no more than about 100 7-bit characters to ensure that all of the desired information can be broadcast in embedded codes which are repeated every 2–4 seconds. If the embedded codes are repeated only slowly then apparatus 20 would not be able to react quickly to changes in program content.

The amount of data that must be transmitted to describe a program can be reduced by transmitting information, such as labels which are selected from a predefined list, by transmitting only an index which identifies the position of the label in the list. For example; if in a group of labels "Action" is the tenth label, then the label "Action" can be transmitted by setting the tenth bit in a block of transmitted data or by otherwise transmitting data representing the index "10" (which can be encoded as one character or less) instead of the string "Action" (which occupies 6 characters). If the program information includes category information relating to one or more multi-level categories of multi-level information which can have one of several levels then it is only necessary to transmit an integer indicating the level for the current program, as described above. It is not necessary to transmit the descriptions for each different level in the category or even for the current level in the category.

Operation of Apparatus

There are many possible informational schemes. It is certain that there will not be universal agreement on one informational scheme for use in all places by all broadcasters. Consequently, apparatus 20 is preferably flexible and needs little or no physical modification to adapt to new informational schemes that apparatus 20 may encounter. The preferred embodiment of the invention includes a programmed computer in apparatus 20. This permits apparatus 20 to be reconfigured by changing software.

As data packets are received in apparatus 20 they are detected by data slicer 40 which may be, for example, a 86129 data slicer and on screen display chip available from Zilog Corporation. In the preferred embodiment of the invention data slicer 40 is a line 21 decoder. Data slicer 40 is connected to video input 22 and monitors received video signal 23 for embedded data.

The operation of apparatus 20 is coordinated by a microprocessor 42, which runs a software program 54 stored in a memory accessible to microprocessor 42 such as ROM 43. Microprocessor 42 may, for example, be a Motorola 6805 microprocessor. Of course, those skilled in the art will readily understand that the functionality described herein can be achieved through the use of different components including the components used for microprocessor 42 and data slicer 40. The particular circuitry associated with microprocessor 42, and the circuitry for interfacing microprocessor 42 to other devices, such as ROM 43 and the other parts of apparatus 20 can have many variations. Those skilled in the art will understand how apparatus 20 could be constructed in light of this disclosure and general knowledge in the industry. The detailed circuitry of apparatus 20 is therefore not described herein.

Each time data slicer 40 detects and decodes a character in the received video signal it transmits the character to microprocessor 42 over data bus 44 and triggers an interrupt in microprocessor 42. Triggering the interrupt causes microprocessor 42 to execute an interrupt handler routine which interprets the received character. The following pseudo code illustrates the operation of the interrupt handler routine. In pseudo-code in this application: get(operand1, operand2) is a function that fetches data from either the IR receiver 65 or data slicer 40. Operand 1 specifies the type of data that is expected. The retrieved data is stored in the variable identified by operand2; convert(time_of_day) converts a string of 4–6 characters which represents the time of day and converts it into a number in the range of 1 to 1440 representing the minute in the day; load_user(operand1) retrieves the data which is identified by operand1 from memory; display(operand) uses on screen display generator 60 to display information pointed to by operand on a display, such as the screen of television 22; update(operand) adds a station's call letters, a program title, or a range of viewing times to a list of restricted call letters, program titles, or viewing times; change(operand1,operand2) changes operand1 by the amount specified in operand2; toggle(operand) switches the value of the variable identified by operand between 2 values; and parse is used to parse incoming classification information and is described more fully below.

XDS Data Receive Algorithm

```
XDS_begin;
get(Start, Type);     'Start is the character that identifies the XDS class
                      'Type is the character that identifies the meaning
                      'of the data within the class
*Current Class
ifStart=01 then
    begin
       ifType=02 thenget(string, duration + time_in_show);
       ifType=03 thenget(string, title);
                                         'get index which identifies label
       ifType=04 thenget(index, type(T_type));
                                         'retrieve category information
       ifType=05 thenfor N=1 to number_of_categories
          begin
             get(n_level(N), classification);    'n_level(N) is an array
             parse(configuration, classification);
          end;
    end;
*Channel Information Class
ifStart=05 then
    ifType=02 thenget(string, channel);
                                         'retrieve call letters of station
*Miscellaneous Class
ifStart=07 then
    ifType=01 thenget(string, time_of_day);
    clock=convert(time of_day);          'set internal clock
*Undefined Class
ifStart=0D then
    begin
       ifType=05 thenget(string, configuration);
XDS_end;
```

As data packets are received by data slicer 40 and transmitted to microprocessor 42, the interrupt routine parses the retrieved data and stores the received data in memory locations 52 in memory 46 according to the data identifier in the encoded information. Memory 46 may be any suitable data storage means but is preferably non-volatile RAM memory such as FRAM. For example: one memory location 52 stores the current value of the level in the violence category "V" for the current program; another memory location 52 stores the call letters of broadcaster 26, another memory location stores the current value of the level in the language category "L" for the current program, another memory location 52 stores a list of the labels which describe aspects of the program etc.

Each time an embedded code data packet is received, microprocessor 42 simply determines what type of information is stored in the received data packet and overwrites the memory location(s) 52 corresponding to that type of information with the data in the received data packet. Microprocessor 42 may use configuration information stored in apparatus 20 which specifies how the encoded information is organized in the received data packet to separate different types of information stored in the data packet before storing the information in memory locations 52.

For example, in a preferred embodiment of the invention all of the program information in an informational scheme including category and/or label information is transmitted in a single XDS data packet. Category information for a number of categories is transmitted first (with information about two categories transmitted in each 7-bit character as described above) followed by label information (with one character specifying a label). The characters used to specify label information are in the range 20h to 3Fh. The character 20h specifies the first label, the character 21h specifies the second label, and so on. An XDS data packet can contain up to 32 characters so, if 4 characters are used to transmit category information, then 28 characters are available for transmitting label information.

Apparatus 20 has stored in it configuration information which identifies the number of multi-level categories and the number of labels being used. If, for example, the configuration information indicates that there are 5 categories, then apparatus 20 treats the first 3 characters in the data packet as being category information (5 categories each having 8 levels or less can be encoded in 3 bytes as described above) and the rest of the characters in the data packet are treated as specifying labels.

If a broadcaster 26 transmits at least one of each type of embedded code about every 2 to 4 seconds then the data stored in memory locations 52 will not be more than about 4 seconds old. The content of embedded codes could change throughout a television program to permit blocking of certain offensive scenes only.

Preferably, whenever microprocessor 42 receives an embedded code containing station identification information (e.g. the call letters of a broadcaster 26) then microprocessor 42 compares the newly received call letters to the previously stored call letters. If the newly received call letters are different from the call letters stored in RAM 46 then the viewer must have selected a different channel. Microprocessor 42 then erases the information stored in memory locations 52 in RAM 46. This eliminates the problem that could be caused if a viewer switched from, for example, watching a program on one channel with extreme violence V=6 to a new channel with no coding for violence. If there were no new data to overwrite the violence level stored in RAM 46 then the viewer could be blocked from viewing the new channel too.

Because embedded codes do not need to be transmitted at specific times, the embedded codes can be transmitted when space is available. If the embedded codes are being transmitted in line 21 of an incoming video signal 24 and other data is also being transmitted on line 21 (for example captions in a different language) then the embedded codes can be buffered. If line 21 of the video signal is full in one frame of the video signal then the embedded codes which were ready to be transmitted with that frame can be saved and transmitted in line 21 one or more subsequent frames of the video signal. This guarantees that the embedded codes do not interfere with the transmission of other data in line 21 of the video signal.

While a user is watching television 22 then microprocessor 42 runs a main portion of software program 54, as illustrated by the following pseudo-code:

Main Program 54

```
Main_begin;
Initialize_data_slicer;
Initialize_OSD;
Configure_interrupt_sources (XDS, IR);
Load_configuration_data;                           'load configuration information
                                                   'load previously stored user prefer-
                                                                                  ences
Load_user(cat_setting(N_cat));                     'category preference information
Load_user(label_list(N_cat+1));                                     'label information
                             'label preference information (in the "type" group of labels)
Load_user(type_list(N_type));
Load_user(channel_list(N_channel));
                                                   'list of channels to block (or permit)
Load_user(title_list(N_title));           'list of program titles to block(or permit)
Load_user(viewing_times);                                      'allowable viewing times
Load_user(allowance);                                           'daily viewing allowance
While (TV_On>0) do
    begin
        Block=Off;                        'default is that video signal 24 can pass
                                          'block video signal 24 if any of the
                                          'following conditions are met
    for i=1 to N_cat do
        if(cat(i)>cat_setting(i)) thenBlock=On;
    for i=1 to N_cat+1 do
        for j=1 to L_type do
            if(label)(j) ∈ label_list(i)) thenBlock=On;
    for i=1 to N_type do
        for j=1 to T_type do
            if(type)(j) ∈ type_list(i)) thenBlock=On;
    for i=1 to N_channel do
        if(channel ∈ channel_list(i)) thenBlock=On;
    for i=1 to N_title do
        if(title ∈ title_list(i)) thenBlock=On;
    if(clock ∈ viewing_times) thenBlock=On;
    if(TV_On>allowance) thenBlock=On;
'display alternative image when Block=On (video signal 24 is blocked)
'by switching switching means 38 and generating blocking screen with
'on Screen display 60
    if(Block=On)        thendisplay(Block_Screen);
                        elsedisplay(normal);
    end;
```

Under the control of software program 54, microprocessor 42 compares the data stored in memory locations 52 with corresponding user preference information stored in, or loaded from, memory locations 56 in non-volatile memory 58. Any suitable compatible non-volatile memory, for example, flash RAM ("FRAM"), electrically erasable programmable ROM ("EEPROM") or a suitable magnetic or other storage medium, may be used for non-volatile memory 58.

When program 54 detects that memory locations 52 contain data which is outside the bounds prescribed by the corresponding memory locations 56 then program 54 causes microprocessor 42 to turn switching means 36 and 38 OFF. When switching means 38 is turned OFF it optionally connects an alternative video signal, such as a display created by an on screen display generator 60, to output 34. FIG. 3 shows an example of such a display. The display of FIG. 3 provides information about the program which is being blocked. This information is available from memory locations 52.

An on screen display generator 60 is commonly incorporated on a single chip with a data slicer 40. On screen display generator 60 can generate and display on the screen of television 22 displays which, for example, provide information about a current program, indicate that a program is being blocked, indicate the current configuration of apparatus 20, and/or guide a user in setting up and configuring apparatus 20.

Apparatus 20 includes input means, which can be any means which allows a user to send information to apparatus 20. In the currently preferred embodiment of the invention, the input means includes an infrared remote control transmitter 71 which transmits control signals to an infrared receiver 65 in apparatus 20. When infrared receiver 65 receives a control signal from infrared transmitter 71 it interrupts processor 42. Software running in processor 42 can then retrieve and interpret the transmitted information.

Preferably a user can override the blocking function of apparatus 20 by entering a password, or identification number, ("PIN"). This permits those who know the PIN to watch an individual television program that apparatus 20 is configured to block without reprogramming apparatus 20. At the end of the program (or after a time period) apparatus 20 resumes its normal function. Apparatus 20 can detect when a program is over by monitoring data packets containing the title or identification number for the current program.

Configuration

Apparatus 20 must be able to recognize the various information that is encoded and embedded in video signal 24. If all programming were described everywhere according to a universal informational scheme, which never changed, then apparatus 20 could be preprogrammed to recognize all of the types of information about video signal 24 in that universal scheme. It is highly unlikely that a universal rating scheme could be agreed upon. People in different countries, and even people in different parts of the same country have differing views regarding what information is appropriate for selecting programming to view and what typed of subject matter might be considered to be offensive. Consequently, the invention provides a method and apparatus to remotely configure apparatus 20 to accommodate new schemes for selecting and transmitting information about video signal 24 that may be introduced to augment or replace existing schemes. This makes it unnecessary to physically alter apparatus 20 if a new informational scheme is adopted.

Broadcaster 26 transmits configuration information which describes the scheme of information about video signal 24 used by broadcaster 26. The configuration information is preferably encoded and embedded in video signal 24 in the same manner as the codes which contain information about video signal 24 are encoded and embedded. When configuration information is received by apparatus 20 it is identified as such by, for example, its XDS data type. The configuration information identifies: the number of categories (0 or more) and the number of levels within each category in the informational scheme; the number of groups of labels (0 or more)and the number of labels in each group. This information is used by apparatus 20 to allocate locations in non-volatile memory means 58 to store user preference information corresponding to each category and each group of labels in the informational scheme. The information is also used when apparatus 20 is initialized to allocate memory locations 52 in RAM 46 to store the received category information and label information.

Preferably the configuration information also identifies the names of the different categories of multi-level information in the informational scheme (e.g. violence, sexuality, language etc.); descriptive labels for each level within each category (e.g., for the violence category: none, comedic, mild, brief, strong, graphic etc.); and some or all of the descriptive labels used in the informational scheme. This information can be provided to a user to assist the user in providing user preference information for storage in apparatus 20. In general, it is easier or a user to select between blocking programming in which the level of violence is "strong" or "graphic" than it is to select between levels "4" and "5".

Configuration information is preferably transmitted in a separate channel so that it does not interfere with program related information. Most cable television networks have a "barker" channel which does not require much of its own information because it merely displays a schedule of television programs which are available for viewing on other channels of the cable network. In a cable television network, configuration information can be conveniently transmitted as XDS data in the barker channel. The configuration information may, for example, be transmitted as XDS data having a selected type (for example 05h) in the undefined class. The configuration information is preferably repeated over and over again, a typical amount of configuration information can be repeated approximately once every 10 seconds or so over an XDS channel. In the alternative, configuration information may be transmitted over a Apparatus 20 can be configured by tuning to the channel containing configuration information and initiating the configuration process (by, for example, selecting a menu option or pushing a control button). An unskilled user can therefore easily initiate a process for reconfiguring apparatus 20 to accommodate changes to the informational scheme in the user's area or to accommodate a different informational scheme which is used in a new area to which the user moves.

The configuration information received by apparatus 20 may describe all of the categories and labels in the informational scheme being used. In the alternative, to minimize the amount of configuration information which is required, the configuration information may specify only additions to a basic informational scheme, such as the scheme specified by EIA-608.

The apparatus and methods described herein assume some knowledge about how any additional category information and/or label information will be encoded. For example, if category information is encoded and embedded in an XDS data packet, as described above, then new categories may be added simply by adding new characters (up to the maximum number of characters allowed in a data packet which is currently 32 characters) to the XDS data packet. The configuration information could include information about how additional information will be encoded and/or embedded. For example, configuration information could include a data type character which is used to identify additional category and/or label information in data packets sent in the "Undefined" class specified by EIA-608.

Configuration Example

In this example, category and label information is transmitted in a single XDS data packet. Category information for a number of categories is transmitted first (with information about two categories transmitted in each 7-bit character as described above) followed by label information (with one character specifying a label). The characters used to specify label information are in the range 20h to 3Fh. The character 20h specifies the first label, the character 21h specifies the second label, and so on. An XDS data packet can contain up to 32 characters so, if 4 characters are used to transmit category information, then 28 characters are available for transmitting label information.

Apparatus 20 receives configuration information which specifies, inter alia, the number of characters in the data packet that contain category information and the number of characters that contain label information.

Configuration information may be transmitted in the XDS undefined class (start character 0Dh) in type 05h (type character 05h). The first character following the start character and the type character indicates whether the data which follows is the name of a category or the name of a group of labels. For example, the character 7Eh could indicate a category name and the character 7Fh could indicate the name for a group of labels. In this example, the rating scheme includes: 4 categories of category information— rating, violence, sexuality and language—each having levels described as in Table II, and a group of eight labels or "keywords" for describing program content—Action, Sexuality, Mild Action, Language, Family, Mature Content, Graphic Violence, and Nudity.

In this example, the informational scheme includes both category information and label information. Configuration information about the categories in the scheme is sent first, followed by configuration information about the labels in the scheme. Apparatus 20 can locate the beginning of the configuration information by looking for the first 7Eh identifier to follow a 7Fh identifier. The configuration information may, for example, be transmitted as follows:

```
0Dh 05h 7Eh R A T I N G 0Fh + Checksum
0Dh 05h E X E M P T 0Fh + Checksum
0Dh 05h G E N E R A L 0Fh + Checksum
0Dh 05h P G 0Fh + Checksum
0Dh 05h A D U L T 0Fh + Checksum
0Dh 05h R E S T R I C T E D 0Fh + Checksum
0Dh 05h 7Eh V I O L E N C E 0Fh + Checksum
```

```
0Dh 05h N O N E 0Fh + Checksum
0Dh 05h C O M E D I C 0Fh + Checksum
0Dh 05h M I L D 0Fh + Checksum
0Dh 05h B R I E F 0Fh + Checksum
0Dh 05h S T R O N G 0Fh + Checksum
0Dh 05h G R A P H I C 0Fh + Checksum
0Dh 05h 7Eh L A N G U A G E 0Fh + Checksum
0Dh 05h N O N E 0Fh + Checksum
. . .
0Dh 05h E X P L I C I T 0Fh + Checksum
0Dh 05h 7Eh S E X U A L I T Y 0Fh + Checksum
0Dh 05h N O N E 0Fh + Checksum
. . .
0Dh 05h E X P L I C I T 0Fh + Checksum
0Dh 05h 7Fh L A B E L S 0Fh + Checksum
0Dh 05h A C T I O N 0Fh + Checksum
0Dh 05h S E X U A L I T Y 0Fh + Checksum
. . .
0Dh 05h N U D I T Y 0Fh + Checksum
```

As each category name is received, microprocessor 42 stores the category name in memory 58. Microprocessor 42 then stores the names of the levels in that category in memory 58. Microprocessor 42 counts the number of categories and the number of levels in each category and stores these numbers in memory 58. When microprocessor 42 detects the identifier 7Fh then it stores the information in that packet as a label group name. If there are no labels in the informational scheme then the label group name can be set to a value such as NULL (00h) to indicate that there are no labels. Microprocessor 42 receives and stores the names for the labels. In this example, the first label name corresponds to character 20h, the second label name corresponds to the character 21h, the third label name corresponds to the character 22h, and so on.

In the example there are 4 categories and 8 labels. This means that the first 2 characters in a data packet containing this information specify category information. Up to eight more characters may specify label information.

When the configuration process is started and microprocessor 42 detects configuration information then microprocessor 42 stores the configuration information in non-volatile memory 58. This is illustrated by the following pseudo code:

Configuration

```
Function parse(configuration, classification);
begin
*Configuration format
N_cat=1;                    'initialize N-cat, the number of categories to 1
get(char, configuration);
whilechar=7E do             'category names are prefaced by, e.g. 7Eh
    begin
    get(cat_name(N_cat), configuration);   'get name of first category
    i=0                                    'get descriptive names for category levels
    get(level_name(N_cat,i), configuration);
    whilelevel_name(N_cat,i)≠null do
        begin
        i=i+1;
        get(level_name (N_cat,i), configuration);
        end;
    N_level(N_cat)=i;       'store number of levels in this category
    N_cat=N_cat+1;
    end;
ifchar=7F then              'descriptive labels are prefaced by e.g. 7Fh
    begin
    get(label_name, configuration);
    i=0;
    get(label(i), configuration);
    whilelabel(i)≠null do
        begin
        i=i+1;
        get(label(i), configuration);
        end;
    N_level(N_cat)=i;
    N_cat=N_cat-1           'Store total number of categories
    end;
*Parse Classification Data
fori=1 to N_cat doget(cat(i), classification);
get(char, classification);
i=1;
whilechar null do
    begin
    label(i)=get(char, classification);
    i=i+1;
    get(char, classification);
    end;
```

User Interface

Figure 4:
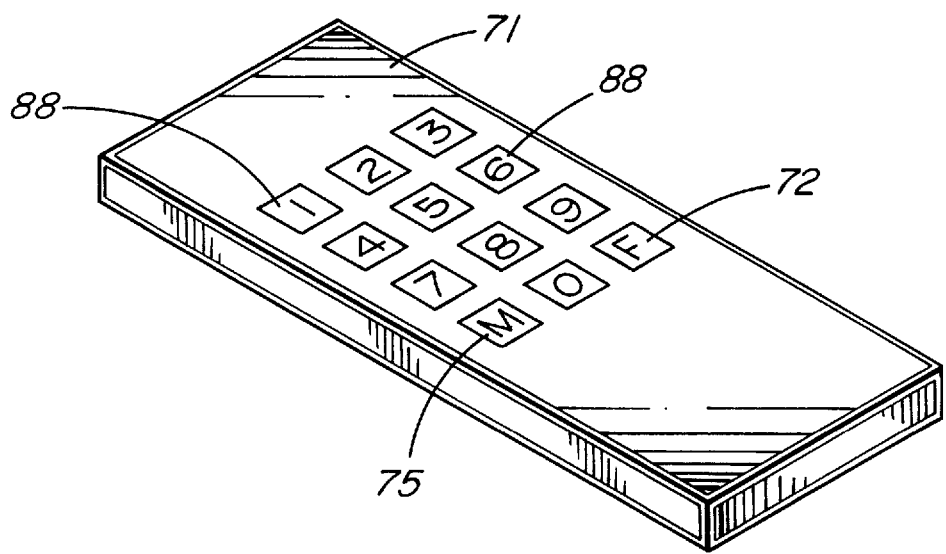
FIG. 4 is a drawing of an infrared remote control transmitter for controlling the operation of the apparatus of FIG. 2.

The architecture of apparatus 20, which is described above, permits an easy to use user interface. In the currently preferred embodiment of the invention the user interface includes an infrared receiver 70 and an on screen display generator 60 both connected to microprocessor 42. The user can set the user preferences stored in apparatus 20 by making selections with an infrared remote control transmitter 71 (FIG. 4) and confirming the changes by viewing the display generated by on screen display generator 60 on the screen of television 22.

Much of the data encoded and embedded in incoming video signal 24 is of interest to viewers. For example, a viewer may be interested in knowing the title of the current television program, how long the current program has left to run etc. Preferably infrared remote control transmitter 71 includes a key 75 which, for a short period, for example, a few seconds, displays the title of the current program together with other information about the current program. This information is stored in memory 46 in apparatus 20. It is therefore trivial to cause microprocessor 42 to send this information through on screen display driver 60 for display on the screen of television 22 as shown, for example, in FIG. 6.

Preferably the system of menus in the user interface is no more than 3 levels deep and permits access to the most often used functions of apparatus 20 with a minimum number of key strokes. The techniques for setting user preferences by means of an infrared remote control are well known and are widely used, for example, in programming VCRs. These well known techniques are therefore not described here in detail.

Figure 5A:
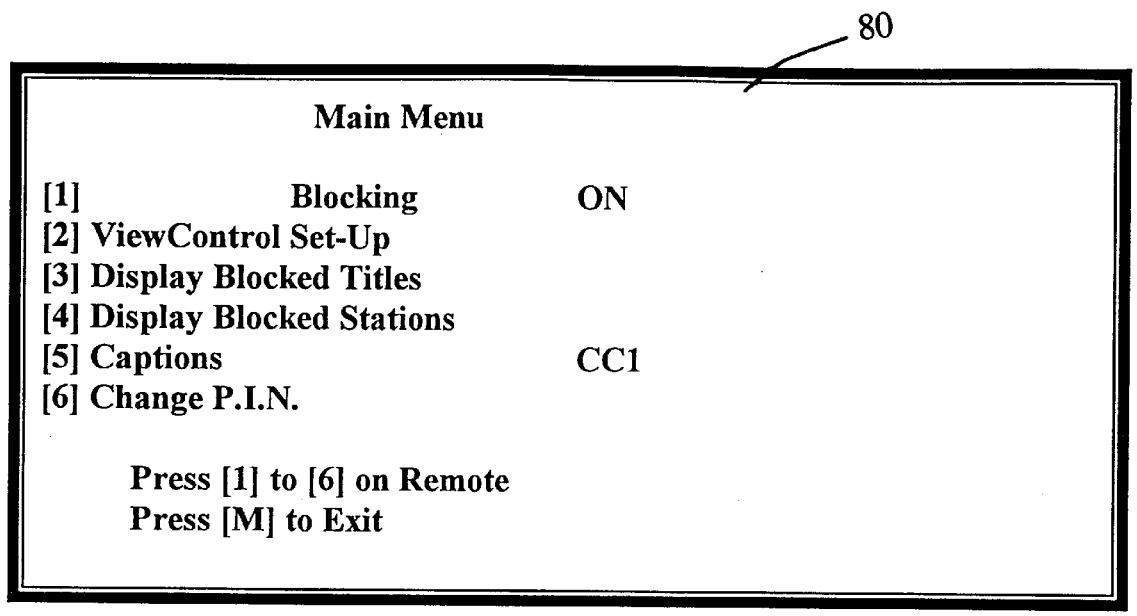

In the currently preferred user interface a user can invoke a main menu 80 by pressing a function key 72 on remote control transmitter 71. When the function key is pressed, microprocessor 42 switches switching means 38 OFF and causes on screen display 60 to display a request that the user enter an access code (or "PIN"). Microprocessor 42 verifies that a valid PIN has been entered. When a valid PIN has been entered then main menu 80, as shown in FIG. 5A, is displayed on the screen of television 22. If a valid PIN is not entered then microprocessor 42 does not permit access to main menu 80.

Main menu 80 provides a user with several options [1] through [6]. The user can select one of these options by pressing the correspondingly numbered one of buttons 88 on infrared remote control transmitter 71. Each selection either sets an operating parameter of apparatus 20 or opens a further menu which may have selections leading to other menus.

The "Blocking" option [1] on menu 80 allows a user to enable, temporarily disable for a selected period of time (or "put to sleep"), or disable completely the blocking function of apparatus 20. The "Blocking" option would be used, for example, by parents who wish to have unlimited access to all television programming without altering other settings of apparatus 20.

Figure 5B:
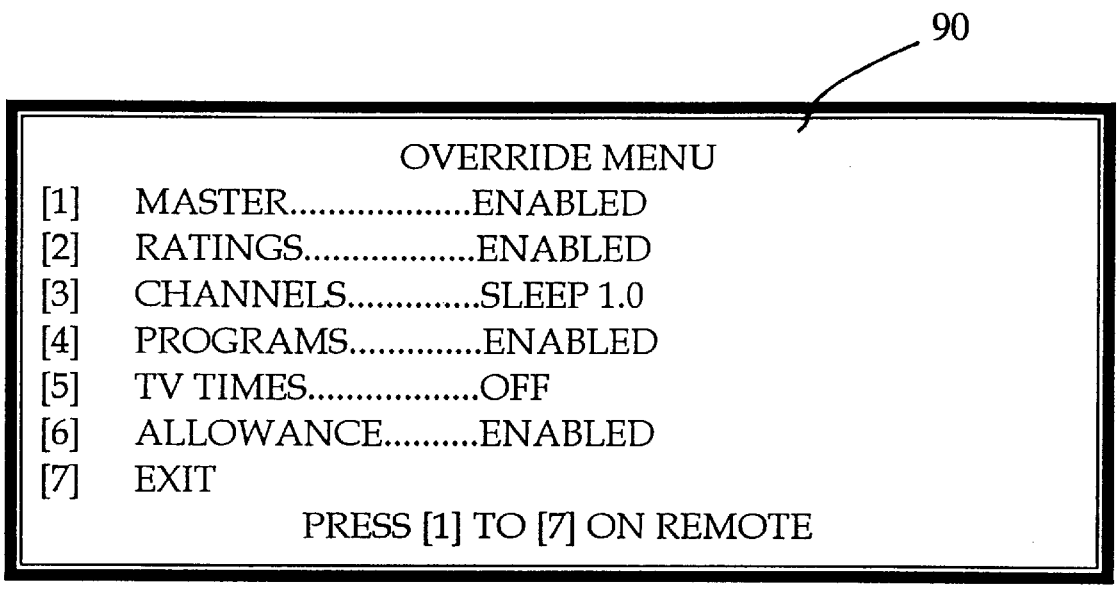

Option [1] could optionally open a menu 90 (FIG. 5B) which allows the features of apparatus 20 to be individually enabled or disabled. Each of the features listed beside options [1] to [6] of menu 90 can be set to ON, SLEEP (for a specified time period) or OFF by pressing the correspondingly numbered one of buttons 88 on remote control transmitter 71 until the desired setting is obtained. If ON is selected, the feature is enabled and will operate according to the manner in which it is configured. If SLEEP is selected the feature will be disabled for a period of time designated by the "Sleep Time". If the user selects OFF the feature will be disabled and will not operate.

The "Master" option [1] of menu 90 can be used to disable or temporarily disable the operation of all blocking features of apparatus 20. In the alternative, a user may simply disable one or more individual features from the list of menu choices which includes: "Ratings Block", "Channel Block", "Program Block", "Viewing Times", and "Daily Allowance" features. In the example menu 90 of FIG. 5B the operation of "Channel Block" has been suspended for one hour. Any channel may be viewed although the incoming video signal 24 may still be blocked by an enabled feature of apparatus 20. No restrictions are placed on specific programs or viewing times because those features are OFF.

Figure 5C:
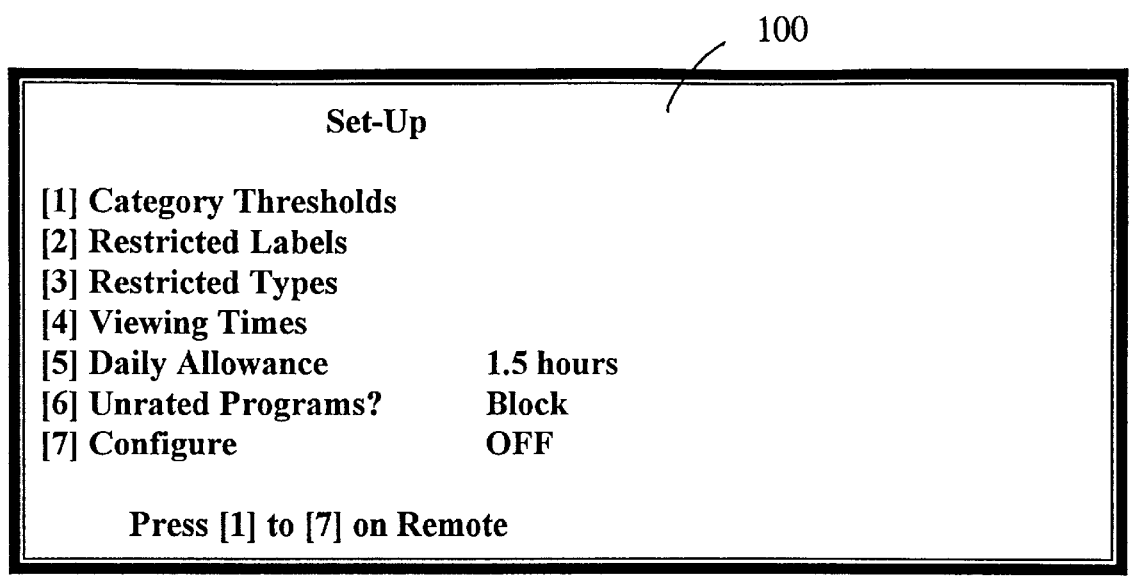
Figure 5D:
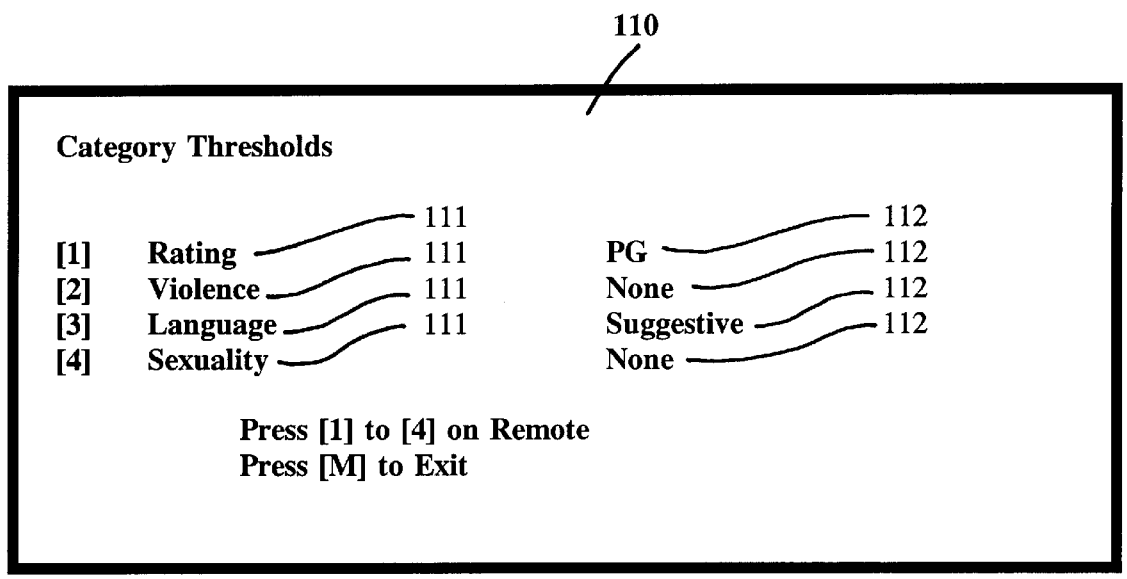

The set up function, option [2] of menu 80 opens a menu 100 (FIG. 5C). Menu 100 lists various parameters that a user can set to affect the operation of apparatus 20. The values that the user selects for these parameters comprise preference information which is stored in memory locations 56 in non-volatile memory 58 and used, as described above, to determine whether or not a received video signal 24 will be blocked by apparatus 20. For example, when a user selects "Category Thresholds" from menu 100, the user is presented with another menu 110 (FIG. 5D). Menu 110 allows the user to set thresholds in the various categories in the informational scheme for which apparatus 20 is configured by, for example, pressing a button on remote control transmitter 71 to cycle through the available levels. The categories correspond to embedded codes containing category information that might be present in incoming video signal 24.

The user is assisted in setting threshold levels because menu 110 displays the descriptive names for the categories, as indicated by 111, as well as the descriptive names 112 for each level in each category. These descriptive names are part of the configuration information according to which apparatus 20 is preferably configured. If apparatus 20 is reconfigured for use with a different rating scheme then menu 110 will display category names and category level descriptions according to the new rating scheme.

After a user has selected thresholds for each category, the currently set threshold level for each category is stored as preference information in non-volatile memory 58. This can be done, for example, when the user exits menu 110. Apparatus 20 will block incoming video signal 24 whenever incoming video signal 24 has an embedded code containing category information identifying a level in a category which equals or exceeds the value of the threshold level for that category (which is stored a memory location 56 for that category in non-volatile memory 58). It can be readily appreciated that apparatus 20 can simultaneously accommodate multiple categories and can be set to block an incoming signal 24 that meets or exceeds a threshold level set for any one category.

The ability to simultaneously handle multiple rating schemes is useful because of the many sources of television programming. Television programming which originates in Canada from a Canadian broadcaster may be rated according to a first rating scheme. Television programming which originates in the United States from a United States broadcaster may be rated according to a second rating scheme. Both sets of television programming may be received by a person located anywhere in North America. It is therefore desirable that a video blocking system can seamlessly accommodate television programming which includes embedded codes containing information relevant to either or both rating schemes. Additional informational schemes set up by, for example, groups of concerned parents could also be handled by apparatus 20.

Options [2] and [3] of menu 100 allow a user to select labels which, if present in an incoming signal, will cause apparatus 20 to block the signal. Option [2] allows a user to specify labels in a group of labels specified by the rating scheme being used. Option [3] allows the user to specify labels from the list of types set out in EIA-608. When restricted labels (option [2]) is selected, a display of various labels that are provided by the informational scheme according to which apparatus 20 has been configured is displayed on television 22 (FIG. 5E). Apparatus 20 can be pre-configured with the various types specified by EIA-608 (FIG. 5F) because these types do not change.

The number of different labels that can be used as criteria to determine whether or not to block video signal 24 is limited in practice only by the amount of memory in apparatus 20. One program may simultaneously have several "labels" associated with it by broadcaster 26. For example, a cartoon about a gruesome mass murderer might have the following labels which describe the type of program in video signal 24: "ANIMATED", "HORROR", "CRIME", and "DRAMA". Other labels describing the program could optionally be embedded in video signal 24 and encoded in an ADVISORY group of labels. For example, a broadcaster could assign key phrases, such as "rape scene", "strong action violence", "strong sexuality", "gory violence", or "brief partial nudity", where appropriate, to a television program. The labels are descriptive and are therefore relatively easy for a user to understand when the user is deciding what labels should cause apparatus 20 to block a video signal 24. The text of the labels is downloaded to apparatus 20 and stored when apparatus 20 is configured as described above.

The "Viewing Times", option [4] of menu 100, permits a user to allow TV viewing only during certain hours of the day. When a user selects option [4] of menu 100 then a menu 160 (FIG. 5I) is displayed. By setting the options on this menu, a user can store viewing time information which specifies time ranges during which television viewing is allowed. At all other times incoming signal 24 will be blocked by apparatus 20. Of course, the viewing time information could specify time ranges during which television viewing is not allowed. Preferably, appropriate viewing time ranges can be set separately for morning, afternoon and evening.

Apparatus 20 preferably reads and decodes embedded codes containing "Time of Day" information (or "time data") which contain information about the time at which video signal 24 is being transmitted by broadcaster 26. Microprocessor 42 then compares the decoded time data with the stored viewing time information. If the result of the comparison indicates that the time data corresponds to a time within an allowed viewing time range then microprocessor 42 operates switching means 36, 38 to allow video signal 24 to be displayed on the screen of television 22. If the result of the comparison indicates that the time data corresponds to a time within a non-allowed viewing time range then microprocessor 42 operates switching means 36, 38 to prevent video signal 24 from being displayed on the screen of television 22.

Because time of day information is contained in incoming video signal 24 the operation of apparatus 20 does not depend on a local clock being accurately set. Further, the operation of apparatus 20 cannot be thwarted by resetting a clock in apparatus 20. Apparatus 20 may include a back-up real time clock for cases in which the incoming video signal does not contain time data.

A user can set the morning start time from 3:00 AM to 11:30 AM in ½ hour increments by displaying menu 160 and pressing the [1] key on remote control 71. The duration for morning viewing is adjustable from 0.5 hours to 9.0 hours in ½ hour increments by pressing the [2] key. The user can set the afternoon start time from 12:00 PM to 5:30 PM in ½ hour increments by pressing the [3] key. Similarly the duration for afternoon viewing is adjustable from 0.5 hours to 6.0 hours in ½ hour increments by pressing the [4] key. Finally, the user can set the evening start time from 6:00 PM to 2:30 AM in ½ hour increments by pressing the [5] key. Similarly the duration for evening viewing is adjustable from 0.5 hours to 9.0 hours in ½ hour increments by pressing the [6] key.

"Daily Allowance", option [5] of menu 100, lets a user set a maximum amount of time that signals to television 22 are not blocked by apparatus 20, in increments of 0.5 hours. The Daily Allowance can be set by displaying menu 100 and repeatedly pressing the [5] key on remote control 71 until the desired daily allowance is displayed.

The Unrated Programs option [6] of menu 100 determines whether programs which are not accompanied by embedded information will be blocked by apparatus 20.

"Display Blocked Stations", option [4] of menu 80, allows a user to view a list of stations (FIG. 5G) which will be blocked by apparatus 20. A user can add a station to the list of prohibited stations by tuning to the undesired station, pressing button 75 on remote control 71 to display information about the station (it may take a few seconds for the data packet containing the call letters to be received) and selecting [2] on the remote control. When this is done, the call letters of the station are added to a list of blocked stations stored in non-volatile memory means 58.

Stations on the list of FIG. 5G may be deleted by pressing the correspondingly numbered key on remote control 71. If there are more than 8 channels in the list the user may press [8] to view and/or modify a list of additional channels. Apparatus 20 can store a large number of station call letters. The list length is limited in practice only by the available non-volatile memory 58 accessible to apparatus 20.

Apparatus 20 could be configured to allow a user to type in directly a list of stations or program titles to be blocked. However, reading the call letters of stations to be blocked and the titles of programs to be blocked directly from data packets in the incoming signals ensures that the blocking information in apparatus 20 will exactly match the information embedded in incoming video signal 24.

"Display Blocked Titles", option [4] of menu 80, allows a user to set up a list 150 of programs (FIG. 5H) which will be blocked by apparatus 20. A user can set up and maintain a list of prohibited programs in essentially the same manner as the user sets up a list of blocked stations. The length of list 150 is limited in practice only by the available amount of non-volatile memory in apparatus 20 available for storing list 150.

The Captions option [5] of menu 80 allows a user to select one of 9 captioning modes. The user may choose to display the information being transmitted in one of the close caption channels CC1 to CC4, information transmitted in one of the text channels T1 through T4 or no caption information. Where data packets representing encoded information for use by apparatus 20 are transmitted in, for example, text channel T2, then apparatus 20 strips out the characters which comprise the data packets before displaying text channel T2.

The Change PIN option [6] of menu 80 allows a user to select a new PIN for access to apparatus 20.

The user interface may be implemented by causing microprocessor 42 to run software which operates generally according to the following pseudo code:

Infra-red (IR) Data Receive and On-Screen Display Algorithm

```
IR_begin;
get(data, key)
ifkey=key 75 then
    begin
    display(Information)
    get(data, selection)
    ifselection=1 thenupdate (title_list)
    ifselection=2 thenupdate (station_list)
    end;
'require user to enter PIN before allowing user to set preferences
ifkey=key 73 thenget(string, PIN);
ifPIN=User_PIN then
    begin
    display(Main);
                        'allow user to pick item from main menu
        get(data, menu_selection);
*Blocking
        ifmenu_selection=1 thenchange(ViewControl_block, +1);
*SetUp
        ifmenu_selection=2 then
            begin
            display(ViewControl_SetUp);
            get(data, menu_selection);
*Category Thresholds
        ifmenu_selection=1 then
            begin
display(cat_name(N_cat), label_name, Category_Thresholds):
            get(data, menu_selection);
            ifmenu_selection<5 then
change(cat_setting(menu_selection), +1);
            ifmenu_selection=M thenexit;
            end;
*Restricted Labels
        ifmenu_selection=2 then
            begin
            display(label(N_level(N_cat)), Restricted_Labels);
            get(data, menu_selection);
            ifmenu_selection<9 thentoggle(label(menu_selection));
            ifmenu_selection=M thenexit;
            end;
*Restricted Types
        ifmenu_selection=3 then
            begin
            display(Restricted Types);
            get(data, menu_selection);
            ifmenu_selection<9 thentoggle(type(menu_selection));
            ifmenu_selection=M thenexit;
            end;
*Viewing Times
        ifmenu_selection=4 then
            begin
```

-continued

```
        display(Viewing_Times);
        get(data, menu_selection);
        ifmenu_selection=1 thenchange(Morning_Start, +30);
        ifmenu_selection=2 thenchange(Morning_Duration, +0.5);
        ifmenu_selection=3 thenchange(Afternoon_Start, +30);
        ifmenu_selection=4 thenchange(Afternoon_Duration, +0.5);
        ifmenu_selection=5 thenchange(Evening_Start, +30);
        ifmenu_selection=6 thenchange(Evening_Duration, +0.5);
        ifmenu_selection=7 thenchange(Time_Zone, +60);
        change(clock, Time_Zone);
        ifmenu_selection=M thenexit;
        update(viewing_times);
        end;
*Daily Allowance
    ifmenu_selection=5 thenchange(Allowance, +0.5);
*Unrated Programs
    ifmenu_selection=6 thenToggle(Unrated);
*Configure
    ifmenu_selection=7 thenToggle(Configure_Enable);
    end;
*Display Blocked Titles
    ifmenu_selection=3 then
        begin
        display(Program_Blocking_list);
        get(data, menu_selection);
        ifmenu_selection<8 thentoggle (program(menu_selection));
        ifmenu_selection=M thenexit:
        end;
*Display Blocked Stations
    ifmenu_selection=4 then
        begin
        display(Channel_Blocking_List);
        get(data, menu_selection);
        ifmenu_selection<8 thenremove(channel(menu_selection));
        ifmenu_selection=M thenexit;
        end;
*Captions
    ifmenu_selection=5 thentoggle(Captions, +1);
*Change PIN
    ifmenu_selection=6 then
        begin
        display(Enter_Old_PIN);
        get(string, PIN);
        ifPIN=User_PIN then
            begin
            display(Enter_New_PIN);
            get(User_PIN);
            end;
        end;
*Exit Menu
    ifmenu_selection=M thenexit;
    end;
IR_end;
```

Embodiment for Use with Multiple Informational Schemes

The systems described above assume that all television programming which is potentially accessible to a viewer is encoded with information according to one informational scheme. In the real world this will not likely be possible. For example, television programming in North America will probably be encoded according to at least 2, and probably 3 or more distinct informational schemes. The United States, Canada and Quebec will likely have their own informational schemes. In addition to these schemes, individual broadcasters may establish their own informational schemes. A television viewer located in Flint Mich., might, for example, receive television channels from stations in Detroit Mich. (encoded according to the U.S. informational scheme), Toronto, Ontario (encoded according to the Canadian informational scheme), and Hull Quebec (encoded according to the Quebec informational scheme).

Preferably apparatus 20 should be able to accommodate multiple informational schemes. This can be achieved, in general, by transmitting with program information data which indicates which one of several (for example, up to 8 or 16) informational schemes has been used to prepare the program data in respect of the program being received. Each informational scheme may have a different number of multi-level categories, different numbers of levels in the categories, and different meanings for the categories and the levels within the categories.

After detecting which informational scheme is in use for a program, apparatus 20 can parse the program information being received according to the structure of the current informational scheme and compare the parsed data to stored user preference information for that informational scheme to determine whether or not to block reception of the program being received.

The following example illustrates an embodiment of the invention capable of dealing with up to 8 informational schemes. Where 8 informational schemes are used then 3 bits are necessary to specify which one of the 8 schemes is in effect for a given program. In this embodiment of the invention, a frequently repeated program rating ("PR") XDS packet (which may be in the XDS current class, type 05h) identifies the informational scheme being used and specifies the values for levels in each category in that scheme. A sequence of program rating configuration and control ("PRCC") packets (which may be in the XDS undefined class type 05h) is used to download configuration information for the informational scheme to apparatus 20.

Preferably, the values chosen to represent levels in individual categories in the different informational schemes are selected to facilitate mapping between different informational schemes. This makes it possible for apparatus 20 to easily set default user preference information for other informational schemes after a user selects user preference information for one informational scheme. For example, Table 4 shows how the age rating levels of the current U.S. (MPAA) system, the Canadian pay-TV) and Quebec (Regie du Cinema) systems could be encoded to facilitate mapping between them.

TABLE IV

| "Level" | MPAA | Pay-TV | Regie du Cinema |
|---|---|---|---|
| 0 | | | |
| 1 | G | G | G |
| 2 | PG | | |
| 3 | PG-13 | PG(13+) | 13+ |
| 4 | R(16+) | A(16+) | 16+ |
| 5 | NC | R(18+) | 18+ |
| 6 | X | | |
| 7 | | | |

For example, a user could select "PG-13" in the MPAA system so that all programming with a higher rating in the age category than PG-13 would be blocked. If the user had not set any preferences for the Pay-TV scheme or the Regie du Cinema scheme then the system would default to PG(13+) in the pay-TV scheme and 13+in the Regie du Cinema scheme. The mapping is easily accomplish ed because all of these age levels are identified as level "3". Similar mapping can be done for levels of violence, sexuality etc. when such categories are present in more than one scheme. Not all schemes have all levels defined. For example, in the Pay-TV scheme of Table IV, level "2" is not defined. Consequently, the age rating "PG" in the MPAA scheme, which corresponds to level "2", would be mapped to the age rating G in the Pay-TV scheme, which corresponds to level "1" (i.e. the closest valid age rating which corresponds to the same or a lower level).

In a currently preferred embodiment of the invention, the PR packet consists of a series of one or more non-ASCII 7-bit characters (in which the highest order bit, bit 6, is set high). Each character can therefore carry 6 bits of information. The first field of 1 to 4 bits of the PR packet identifies the informational scheme to which the remaining information in the packet relates. The second field of 1–4 bits is the current value for a level in an "age" category. The next field of 1–4 bits is the current value for a level in a "violence" category (if the informational scheme has such a category). Additional fields of 1–4 bits each can specify the current value for a level in additional categories.

The PR packet is preferably short enough so that it can be retransmitted frequently enough to provide quick blocking if a value in a category changes to exceed the value specified by the user. Where the PR packet is transmitted as XDS data then the PR packet must be 12 characters or less in length (which can contain 68 bits of data plus a checksum) and should most preferably be only 2 to 4 characters long. A useful informational scheme might have a PR packet as follows: 3 bit "system" field which identifies one of eight informational schemes; 3 bit "age" category information (to specify one of up to 8 levels); 2 bit "violence" category information (to specify one of up to 4 levels); 2 bit "language" category information (to specify one of up to 4 levels); and, 2 bit "sexuality" category information (to specify one of up to 4 levels). The PR packet in informational schemes which have this structure need to contain only 12 data bits.

Configuration information about the informational scheme being used may be transmitted in PRCC packets. In general, the configuration information should preferably be completely transmitted at least once every 10 minutes. Because it is not desirable for packets to be very long it is desirable to break up the configuration information for an informational scheme into a sequence of several PRCC packets. It is convenient to divide the configuration information for an informational scheme into "system" information, "category configuration" information, and "level configuration" information. System information includes basic information about the informational scheme such as the name of the informational scheme, the number of categories in the informational scheme and the number of bits used to define the system field. Category information includes information about categories such as the name of each category, the number of bits used to define each category, and the number of levels in the category. Level information included information about individual levels in a category such as the name of each level.

For example, suppose an informational scheme called "HBO" provides the categories and levels shown in Table V. We shall assume that there are 8 or fewer informational schemes in use. Therefore, we can use 3 bits to specify informational scheme. We assume that the informational scheme of Table V has been assigned the number 2.

TABLE V

| Level | Age Rating | Violence | Language | Sexuality |
|---|---|---|---|---|
| 0 | Exempt | None | None | None |
| 1 | G | Mild | Adult | Brief Nudity |

TABLE V-continued

| Level | Age Rating | Violence | Language | Sexuality |
|---|---|---|---|---|
| 2 | | Violent | | Adult Content |
| 3 | PG | Graphic | Graphic | Sexual Content |
| 4 | PG-13 | | | |
| 5 | R | | | |
| 6 | NC-17 | | | |
| 7 | | | | |

According to this scheme, a program which was rated PG-13, had "Mild" violence and "Brief Nudity" could be described by a PR packet containing the bit string: 010100010001. The first 3 bit field of the bit string contains 010b which indicates that this packet contains information according to informational scheme "2". The next 3 bits, 100, indicate that the rating for the program is level 4 (which corresponds to PG-13 as shown in Table V). The next 2 bits, 01, indicate that the program has violence of level 1 (Mild violence). The next 2 bits, 00, indicate that the language in the program is level 0 (None). The final 2 bits 01, correspond to sexuality level 1 (Brief Nudity). This bit string would be transmitted in a PR packet as [Current Class 01h, Type 05h, 54h, 51h, Terminator 0Fh, Checksum] as the following string of characters: [01h, 05h, 54h, 51h, 0Fh, Checksum].

Where the description of an informational scheme is provided in several PRCC packets of different types then each PRCC packet should include a field which identifies its type. Where there are 3 types of PRCC packet, as described above, then 2 bits suffice to identify the type of PRCC packet. For example, "system", "category" and "level" type PRCC packets could be identified by types 0, 1 and 2 respectively.

A "system" type PRCC packet for the informational scheme of Table V could, for example, contain the following fields: TYPE field (2 bits) containing 00b to indicate that this packet is a "system" type packet; NUMBER field (4 bits) containing the number of the informational scheme, in this case 0010b for scheme 2; a BITS field (2 bits) containing the number of bits that are significant in the NUMBER field (in this case the BITS field contains 2 (010b) which allocates 3 bits in the System field. This means that up to 8 informational schemes can be defined) and a CATEGORIES field (4 bits) containing the number of categories in the informational scheme (in this case 4). The PRCC packet also contains the name of the informational scheme. The binary data in this system type PRCC packet requires 12 bits and can therefore be transmitted as 2 non-ASCII characters in an XDS data packet. The name of the informational scheme can be transmitted as a string, for example a string of ASCII characters, after the data carrying characters. For example, if the name of the scheme of Table V was "HBO" then the name "HBO" would be transmitted in the system type PRCC packet.

The system type PRCC packet optionally and preferably contains a revision code which is changed each time the information conveyed by the PRCC packets changes. For example, the revision code could be contained in a character transmitted immediately before the character string containing the name of the informational scheme. Apparatus 20 can monitor the revision code. If apparatus 20 has already received a complete PRCC packet sequence corresponding to that revision code then it is not necessary for apparatus 20 to parse the PRCC packets being received because the information contained in those packets has previously been received and stored in apparatus 20.

Information about the categories in the system is transmitted in category type PRCC packets. A category type PRCC packet for the informational scheme of Table V could, for example, include the following fields: a type field (2 bits) containing the value 01b to indicate that this is a category type PRCC packet; a NUMBER field (4 bits) containing the number of the category described by the packet, as the age rating category is the first category in the scheme of Table V it could be identified by the value 0000b in the NUMBER field, the violence category could be identified by the value 0001b in the NUMBER field and so on; a BITS field (2 bits) containing a number representing the number of bits in the category (e.g. 3 for the age rating category); an ELEMENTS field (4 bits) specifying the number of levels that are defined in the category (for example, while the rating category could have up to 8 levels, only 6 levels are defined). Since every category must have at least one level, the value 0000b in the binary field could specify one level, and so on. The data above takes up 12 bits and so can be transmitted as two characters. The category type PRCC packet also contains a string containing the name of the category. For example, the age rating category of Table V could have a category type PRCC packet containing two non-ASCII characters containing the bit string 010000100101b followed by the ASCII characters RATING. The category names should be reasonably short, for example, 16 characters or less long, both to conserve memory in apparatus 20 and to reduce the amount of data in the PRCC packets.

A "level" type PRCC packet is transmitted for each level in each category of the informational scheme. Each level type PRCC packet may, for example, include a binary string containing the following fields: a TYPE field (2 bits) containing the value 10b indicating that this is a level type PRCC packet; and a NUMBER field (4 bits) containing the number of the level in question. This binary information can conveniently be transmitted in 1 character. The level type PRCC packets also include a character string containing the name of the level. This character string can be transmitted immediately after the character containing binary information.

A sequence of PRCC packets that could be transmitted to specify the informational scheme of Table V is shown in Table VI. Each PRCC packet begins with the characters 0Dh 05h to specify the XDS undefined class and type. Each PRCC packet ends with the character 0Fh and a checksum character. The packets are conveniently sent in the order in which they are listed in Table VI.

TABLE VI

| Packet Type | First Data Character | Second Data Character | ASCII String |
| --- | --- | --- | --- |
| System | 42h | 63h | HBO |
| Category | 50h | 66h | Rating |
| Level | 60h | | Exempt |
| Level | 61h | | G |
| Level | 63h | | PG |
| Level | 64h | | PG-13 |
| Level | 65h | | R |
| Level | 66h | | NC-17 |
| Category | 51h | 53h | Violence |
| Level | 60h | | None |
| Level | 61h | | Mild |
| Level | 62h | | Violent |
| Level | 63h | | Graphic |

TABLE VI-continued

| Packet Type | First Data Character | Second Data Character | ASCII String |
| --- | --- | --- | --- |
| Category | 52h | 53h | Language |
| Level | 60h | | None |
| Level | 61h | | Adult |
| Level | 63h | | Graphic |
| Category | 53h | 53h | Sexuality |
| Level | 60h | | None |
| Level | 61h | | Brief Nudity |
| Level | 62h | | Adult Content |
| Level | 63h | | Sexual Content |

Apparatus 20 can synchronize to the PRCC data stream by monitoring the PRCC packets until it receives a "system" type PRCC packet. The configuration data about the informational scheme that is maintained in memory in apparatus 20 is updated after the final PRCC level description in the final category has been received. The PRCC packets may be sent along with other XDS date at low priority so that the entire sequence of PRCC packets is transmitted at least as often as about every 10 minutes.

It is generally desirable to keep apparatus 20 simple, and therefore inexpensive because an apparatus 20 is preferably provided for each television set. Consequently, it is desirable to have an efficient way to store configuration information in apparatus 20. The information transmitted in the PRCC packets described above can be stored in a data structure that is both compact and can be easily navigated. The preferred data structure 200 illustrated in FIG. 7 makes use of headers, pointers and strings. Some records have been omitted from FIG. 7 for clarity.

Data structure 200 begins with a record 210 which includes a header 211, a string 211 and a group of pointers 213. Header 211 comprises 6 bits, 2 bits which specify the number of bits needed to specify a particular informational scheme (3 bits for up to 8 informational schemes and 4 bits for up to 16 informational schemes), and 4 bits which specify the length of string 212. String 212 may be displayed to a user during the configuration process. Group 213 includes one pointer 215 for each possible informational scheme. For example, if header 211 specifies that the number if informational schemes is specified in 3 bits then there will be 8 pointers 215 in group 213. Pointers 215 which correspond to an informational scheme for which there is no stored configuration information in apparatus 20 may contain a specific value, for example, a null value. Pointers 215 should be large enough to point to the locations of records 220 as discussed below. For example, where it is possible that records 220 will be more than 256 bytes away, then pointers 215 should be 2 byte pointers.

When configuration information about an informational scheme is stored in data structure 200 then the corresponding one of pointers 215 points to a first record 220 describing that informational scheme. Record 220 comprises a header 221, a string 222 containing the name of the informational scheme, and a group 223 of pointers 225. Header 221 includes 4 bits containing the number of categories in the informational scheme, and 4 bits containing the length of string 222 which contains the name of the informational scheme. Group 223 contains one pointer 225 for each category in the informational scheme. Each pointer 225 points to a record 230 for the category corresponding to that pointer.

Records 230 each include a header 231, a string 232 containing the name of the category, and a group 233 of pointers 235. Header 231 includes 2 bits containing the number of bits used to specify levels in the category, and 4 bits containing the length of string 232 which contains the name of the category. Group 233 contains one pointer 325 for each possible level that could be specified with the number of bits recorded in header 231. Each pointer 235 points to a record 240 for the level corresponding to that pointer. If the informational scheme does not have a level corresponding to that pointer then the pointer points to the next lower level that does exist in the informational scheme. For example, in the informational scheme of Table V, the age rating category does not have a level with a value of 2. Consequently, as shown in FIG. 7, the third pointer 235 points to the same record 240 as the second pointer 235.

Records 240 each contain a header 241 and a string 242 containing the name of the level which corresponds to that record. Header 241 contains 4 bits which indicate the value assigned to that level and 4 bits which specify the length of string 242.

Figure 7:
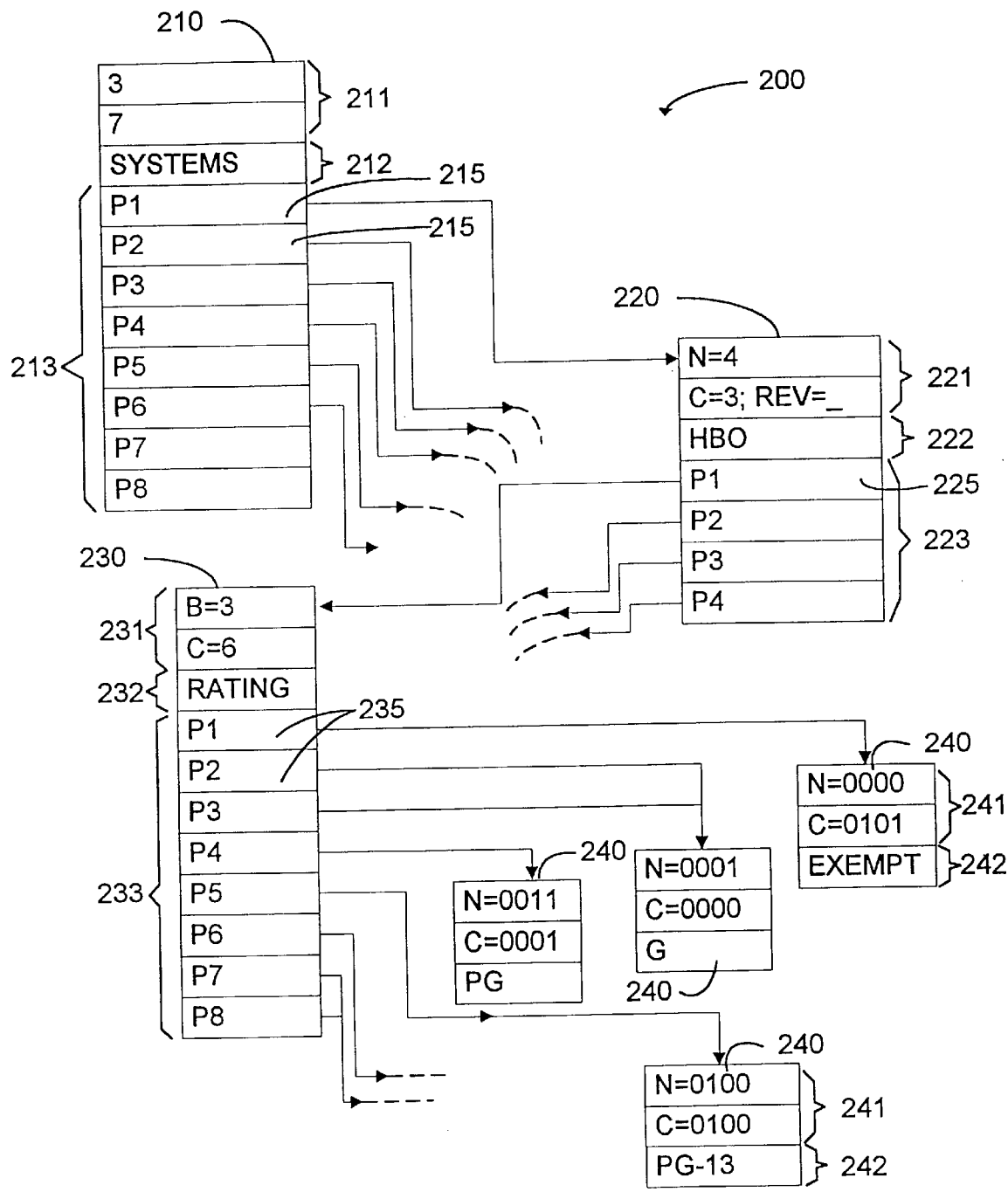

By using a data structure 200 as shown in FIG. 7, the configuration information for the informational scheme of Table V would include one record 220, four records 230 and 17 records 240. The data for the informational scheme would occupy only 185 bytes in data structure 200. If data structure 200 contained configuration information for 3 informational schemes of the same size as that of Table V then the entire data structure 200 would still occupy only 579 bytes. 579 bytes could be readily stored in a small memory such as a 1 kilobyte FRAM. Preference information could be stored in the same memory. If the preference information were stored in the same format as described above for a PR data packet then the preference information would occupy only 2 bytes for each informational scheme like the one of Table V.

Of course, the configuration information for an informational scheme could be broken up into packets and/or transmitted differently than is set out above. Different data structures could be used to store configuration information and preference information. What is described here is a currently preferred embodiment of the invention. Those skilled in the art will realize that the invention encompasses many variations of the system described above.

The methods and apparatus of the invention provide parents with a great deal of flexibility in blocking programming which they consider to be undesirable. In addition to blocking programs which exceed set thresholds in categories in one or more rating schemes or which include labels selected from one or more groups of labels, parents can:

block out specific channels (at specific times, if desired);

block out programs of a specific title, for example, parents can block their children from watching a program having the name "The X Files" at any time, regardless of the ratings assigned to any specific episode of that program;

block programs which contain labels identifying them as being of particular types, for example, parents could set apparatus 20 to block programs of one or more of the following types: combat, crime, erotica, fantasy, horror, soap opera, suspense, talk, etc.;

block access to all programming at certain times of day. Parents can also limit viewing time to a set amount of time per day.

All of the above functions are available to parents in a consistent way. Those skilled in the art will realize that the foregoing description of a user interface can be varied in many ways without departing from the scope of the invention. The user interface need not use a remote control 71 but could use any known means for accepting input from a user. The user interface need not display information on the screen of television 22 but may use some alternative display means to advise a user about the status of apparatus 20. Apparatus 20 need not include all of the features described above and may include additional features. The menu structure described above may be departed from while staying within the scope of the invention.

As will be apparent to those skilled in the art in the light of the foregoing disclosure, many alterations and modifications are possible in the practice of this invention without departing from the spirit or scope thereof.

I claim:

1. A video program transmission method for enabling a viewer to receive information useful for selectively blocking the viewing of television programming, said method comprising the steps of:

a) transmitting a plurality of television channels to a viewer;

b) for each said channel in a first group of one or more of said channels, embedding program information comprising at least a value representing a level in first multi-level category of a first informational scheme for a program being transmitted on said each channel;

c) for each said channel in a second group of one or more of said channels, embedding program information comprising at least a value representing a level in second multi-level category of a second informational scheme for a program being transmitted on said each channel; and, d) transmitting to said viewer first and second sets of configuration information, said first set of configuration information comprising at least a value representing a number of levels in said first multi-level category and descriptive names for said category and one or more of said levels in said first category according to said first informational scheme, said second set of configuration information comprising at least a number of levels in said second multi-level category and descriptive names for said second category and one or more of said levels in said second category according to said second informational scheme.

2. The method of claim 1 wherein said step of embedding program information comprises, embedding in each of said television channels program information relevant to that television channel.

3. The method of claim 2 wherein said step of embedding configuration information comprises embedding in each of said television channels program information relevant to that television channel.

4. The method of claim 3 wherein said step of embedding said program information in each of said television channels comprises encoding and transmitting said program information as XDS data in said each television channel.

5. The method of claim 4 wherein said step of embedding said configuration information in each of said television channels comprises encoding and transmitting said configuration information as XDS data in said each television channel.

6. The method of claim 5 wherein said step of encoding and transmitting said configuration information comprises transmitting a separate XDS data packet containing the name of each of said levels in said informational scheme to which said configuration information relates.

7. A method for selectively blocking video signals, said method comprising the steps of:

a) receiving first configuration information embedded in a first television channel, said first configuration information describing a first informational scheme, said first configuration information specifying, at least, numbers of levels in a first group of one or more multi-level categories of labels, in said first informational scheme;

b) storing said first configuration information in a memory;

c) receiving second configuration information embedded in a second television channel, said second configuration information describing a second informational scheme, said second configuration information specifying, at least, numbers of levels in a second group of one or more multi-level categories of labels, in said second informational scheme;

d) storing said second configuration information in said memory;

e) storing in said memory user preference information for each of said categories in each of said first and second informational schemes;

f) receiving a first video signal comprising embedded information specifying at least, either one of said first or second informational schemes, and current levels in each of said one or more categories in said specified informational scheme;

g) extracting said embedded information and comparing said extracted information with said stored preference information for said specified informational scheme;

h) if the result of said comparison indicates that said first video signal should not be displayed, blocking said first video signal from being displayed on a video display; and, i) if the result of said comparison indicates that said first video signal should be displayed, allowing said first video signal to be displayed on said video display.

8. The method of claim 7 wherein said step of receiving said first configuration information comprises tuning to a first television channel and receiving embedded information comprising said first configuration information.

9. The method of claim 8 wherein said step of receiving said second configuration information comprises tuning to a second television channel and receiving embedded information comprising said second configuration information.

10. The method of claim 9 wherein said first configuration information comprises descriptive text for two or more levels in each of said first group of categories and said second configuration information comprises descriptive text for two or more levels in each of said second group of categories.

11. The method of claim 10 wherein said step of storing said user preference information comprises displaying on a display said descriptive text for labels in said first informational scheme and accepting from a user, and storing, user preference information for said first informational scheme said user preference information comprising a threshold level for each of said categories in said first informational scheme.

12. The method of claim 11 wherein said step of storing said user preference information comprises setting a threshold level for a first category in said second informational scheme to a value equal to a threshold level set for a first category in said first informational scheme.

13. The method of claim 10 wherein said step of storing said first configuration information comprises storing in a first record in said memory a pointer to a second record containing a name for said first informational scheme.

14. The method of claim 13 wherein said step of storing said first configuration information comprises storing in said second record pointers to a set of one or more third records, each of said one or more third records containing a name of a category in said first informational scheme.

15. The method of claim 14 wherein said step of storing said first configuration information comprises storing in each of said third records pointers to a set of two or more fourth records, each of said two or more fourth records containing a name of a level in said category of said first informational scheme and a numeric value for said level.

* * * * *

(12) EX PARTE REEXAMINATION CERTIFICATE (9208th)
United States Patent
Collings

(10) Number: US 5,828,402 C1
(45) Certificate Issued: Aug. 21, 2012

(54) METHOD AND APPARATUS FOR SELECTIVELY BLOCKING AUDIO AND VIDEO SIGNALS

(75) Inventor: Timothy David Collings, White Rock (CA)

(73) Assignee: Wi-LAN, Inc.

Reexamination Request:
No. 90/009,657, Dec. 24, 2009

Reexamination Certificate for:
Patent No.: 5,828,402
Issued: Oct. 27, 1998
Appl. No.: 08/761,091
Filed: Dec. 5, 1996

Related U.S. Application Data

(63) Continuation-in-part of application No. 08/667,030, filed on Jun. 20, 1996, now abandoned.

(30) Foreign Application Priority Data

Jun. 19, 1996 (CA) .............................................. 2179474

(51) Int. Cl.
*H04N 7/16* (2006.01)
*H04N 7/00* (2006.01)

(52) U.S. Cl. ..................... 725/28; 348/460; 348/E5.105; 348/E7.036; 348/E7.061; 380/240; 380/241; 725/27; 725/29; 725/30

(58) Field of Classification Search .................. None
See application file for complete search history.

(56) References Cited

To view the complete listing of prior art documents cited during the proceeding for Reexamination Control Number 90/009,657, please refer to the USPTO's public Patent Application Information Retrieval (PAIR) system under the Display References tab.

*Primary Examiner* — Joseph R. Pokrzywa

(57) ABSTRACT

A method and apparatus block the reception of television programming which meets specified criteria. Data packets describing television programming are broadcast with the television signal. The data packets include at least packets which contain category information specifying a level in one or more multi-level categories and/or label information specifying labels applied to the program content of the signal. Data packets in an incoming video signal are detected by a blocking apparatus and compared to preferences stored in non-volatile memory in the blocking apparatus. If the contents of the data packets match or exceed the stored preferences then the video signal is blocked. The apparatus is field configurable. Configuration information specifying the rating scheme is transmitted to the apparatus. The methods of the invention are extremely flexible and allow several different rating systems to be used simultaneously.

Restricted Labels

[1] ALLOW:   Mild Action
[2] BLOCK:   Action
[3] BLOCK:   Sexuality
[4] ALLOW:   Language
[5] BLOCK:   Mature Content
[6] ALLOW:   Family
[7] BLOCK:   Graphic Violence
[8] BLOCK:   Nudity Press [1] to [8] on Remote
Press [M] to Exit

US 5,828,402 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 7-15 is confirmed.

New claims 16-48 are added and determined to be patentable.

Claims 1-6 were not reexamined.

16. *The method of claim 7 wherein said first television channel and said second television channel are the same channel.*

17. *The method of claim 7 wherein said memory comprises a plurality of discrete memory devices.*

18. *The method of claim 17 wherein said plurality of discrete memory devices comprises at least one of an FRAM, a RAM, an EEPROM and a buffer.*

19. *The method of claim 17 wherein at least two of said first configuration information, said second configuration information and said user preference information are stored in separate memory devices from each other.*

20. *The method of claim 7 wherein said first video signal comprises composite audio and video signals and embedded codes.*

21. *The method of claim 7 wherein said embedded information is received in the form of at least one digital data packet.*

22. *The method of claim 7 wherein each of said first and second configuration information is included in at least one packet in a sequence of packets.*

23. *The method of claim 22 wherein said steps of receiving each of first and second configuration information includes receiving a revision code and not parsing further packets.*

24. *The method of claim 22 wherein at least a revision code is found in at least one packet of said sequence of packets.*

25. *The method of claim 7 wherein said one or more multi-level categories of at least one of said first and second informational schemes include at least one of age, violence, language and sexuality.*

26. *The method of claim 7 wherein said first video signal comprises an audio portion and a video portion and wherein said step of blocking said first video signal further comprises blocking said audio portion and said video portion.*

27. *The method of claim 7 wherein said first and second television channels comprise RF television channels.*

28. *The method of claim 7 wherein said embedded information is for a current program.*

29. *The method of claim 7 wherein said embedded information includes providing a null value for at least one of said levels.*

30. *The method of claim 7 wherein said first video signal further comprises a video portion and an audio portion, and wherein said embedded information, said video portion and said audio portion are combined within said first video signal.*

31. *The method of claim 7 wherein said step of receiving said first configuration information embedded in a television channel comprises receiving a video signal including encoded digital data packets.*

32. *The method of claim 7 further comprising the step of using one of said received first or second configuration information to augment or replace an existing informational scheme.*

33. *The method of claim 7 wherein at least one of said first or second configuration information is pre-configured in said memory.*

34. *The method of claim 33, wherein said pre-configured configuration information comprises labels from a list of types defined in EIA-608.*

35. *The method of claim 7 wherein one of said received first and second configuration information describes said first or second informational scheme that has been previously stored in a persistent memory.*

36. *The method of claim 35 wherein said first or second informational scheme stored in said persistent memory was received in a prior video signal.*

37. *The method of claim 7 wherein said first and second configuration information are temporarily stored in said memory.*

38. *A method for selectively blocking video signals, said method comprising the steps of:*

*a) receiving first configuration information embedded in a first television channel, said first configuration information describing a first informational scheme, said first configuration information specifying, at least, numbers of levels in a first group of one or more multi-level categories of labels, in said first informational scheme;*

*b) storing said first configuration information in a memory;*

*c) receiving second configuration information embedded in a second television channel, said second configuration information describing a second informational scheme, said second configuration information specifying, at least, numbers of levels in a second group of one or more multi-level categories of labels, in said second informational scheme;*

*d) storing said second configuration information in said memory;*

*e) storing in said memory user preference information for each of said categories in each of said first and second informational schemes;*

*f) receiving a first video signal comprising embedded information specifying at least, either one of said first or second informational schemes, and current levels in each of said one or more categories in said specified informational scheme;*

*g) extracting said embedded information and comparing said extracted information with said stored preference information for said specified informational scheme;*

*h) if the result of said comparison indicates that said first video signal should not be displayed, blocking said first video signal from being displayed on a video display; and,*

*i) if the result of said comparison indicates that said first video signal should be displayed, allowing said first video signal to be displayed on said video display;*

*j) comparing said received first and second configuration information with at least one of first and second configuration information previously stored; and* k) determining if said at least one of said received first and second configuration is identical to at least one of said previously stored first and second configuration information.

39. The method of claim 38 wherein said first information further comprises a first revision code related to said first informational scheme and second information further comprises a second revision code related to said second informational scheme.

40. The method of claim 39, wherein said step of determining is based at least in part on at least one of said first revision code and said second revision code.

41. The method of claim 7 wherein one of said first and second information schemes is the Motion Pictures Association of America ("MPAA") rating scheme.

42. The method of claim 41 wherein the other of said first and second information schemes is one of Pay-TV rating scheme and Regie du Cinema rating scheme.

43. The method of claim 7 wherein said first informational scheme and said second information scheme are included in a single table.

44. The method of claim 43 wherein said single table enables mapping between said first informational scheme and said second informational scheme.

45. An apparatus for selectively blocking video signals, said apparatus comprising:
   a) a receiver configured to receive:
      (i) first configuration information embedded in a first television channel, said first configuration information describing a first informational scheme, said first configuration information specifying, at least, numbers of levels in a first group of one or more multi-level categories of labels, in said first informational scheme;
      (ii) second configuration information embedded in a second television channel, said second configuration information describing a second informational scheme, said second configuration information specifying, at least, numbers of levels in a second group of one or more multi-level categories of labels, in said second informational scheme; and
      (iii) a first video signal comprising embedded information specifying at least, either one of said first or second informational schemes, and current levels in each of said one or more categories in said specified informational scheme;
   b) memory configured to store:
      (i) said first configuration information and said second configuration information; and
      (ii) user preference information for each of said categories in each of said first and second informational schemes; and
   c) a processor configured to extract said embedded information and compare said extracted information with said stored preference information for said specified informational scheme, and the processor is further configured so that if the result of said comparison indicates that said first video signal should not be displayed, the processor is configured to block said first video signal from being displayed on a video display and, if the result of said comparison indicates that said first video signal should be displayed, the processor is configured to allow said first video signal to be displayed on said video display.

46. An apparatus for selectively blocking video signals, said apparatus comprising:
   a) a receiver configured to receive:
      (i) first configuration information embedded in a first television channel, said first configuration information describing a first informational scheme, said first configuration information specifying, at least, numbers of levels in a first group of one or more multi-level categories of labels, in said first informational scheme;
      (ii) second configuration information embedded in a second television channel, said second configuration information describing a second informational scheme, said second configuration information specifying, at least, numbers of levels in a second group of one or more multi-level categories of labels, in said second informational scheme; and
      (iii) a first video signal comprising embedded information specifying at least, either one of said first or second informational schemes, and current levels in each of said one or more categories in said specified informational scheme;
   b) memory configured to store:
      (i) said first configuration information and said second configuration information; and
      (ii) user preference information for each of said categories in each of said first and second informational schemes; and
   c) a processor configured to extract said embedded information and compare said extracted information with said stored preference information for said specified informational scheme, and the processor is further configured so that if the result of said comparison indicates that said first video signal should not be displayed, the processor is configured to block said first video signal from being displayed on a video display and, if the result of said comparison indicates that said first video signal should be displayed, the processor is configured to allow said first video signal to be displayed on said video display, wherein said processor is further configured to:
   compare said received first and second configuration information with at least one of first and second configuration information previously stored in said memory; and
   determine if said at least one of said received first and second configuration is identical to at least one of said previously stored first and second configuration information.

47. The apparatus of claim 46, wherein said first configuration information further comprises a first revision code related to said first informational scheme and second configuration information further comprises a second revision code related to said second informational scheme.

48. The apparatus of claim 47, wherein said processor is configured to determine if said at least one of said received first and second configuration is identical to at least one of said previously stored first and second configuration information based at least in part on at least one of said first revision code and said second revision code.

* * * * *